(12) United States Patent
Klein et al.

(10) Patent No.: US 10,367,942 B2
(45) Date of Patent: *Jul. 30, 2019

(54) SYSTEM AND METHOD FOR ANALYTICS WITH AUTOMATED WHISPER MODE

(71) Applicant: AT&T Intellectual Property I, L.P., Atlanta, GA (US)

(72) Inventors: Reuben Klein, East Brunswick, NJ (US); Mazin E. Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,443

(22) Filed: Oct. 4, 2018

(65) Prior Publication Data

US 2019/0037076 A1    Jan. 31, 2019

Related U.S. Application Data

(63) Continuation of application No. 15/860,066, filed on Jan. 2, 2018, now Pat. No. 10,122,857, which is a
(Continued)

(51) Int. Cl.
*H04M 3/00* (2006.01)
*H04M 5/00* (2006.01)
(Continued)

(52) U.S. Cl.
CPC ...... *H04M 3/5191* (2013.01); *H04L 12/1827* (2013.01); *H04L 51/02* (2013.01);
(Continued)

(58) Field of Classification Search
CPC ...... H04M 3/51; H04M 3/5183; H04M 3/523; H04M 3/5166
(Continued)

(56) References Cited

U.S. PATENT DOCUMENTS 5,983,369 A    11/1999  Bakoglu et al.
6,553,108 B1    4/2003  Felger
(Continued)

OTHER PUBLICATIONS

"Mattersight", When Personalities Click, Magic Happens, Behavioral Routing Software for Call Centers [www.mattersight.com/], Mar. 28, 2016.

*Primary Examiner* — Thjuan K Addy
(74) *Attorney, Agent, or Firm* — Guntin & Gust, PLC; Jay H. Anderson

(57) ABSTRACT

A service session is facilitated via a packet switched network; in the service session, user equipment participates in an interactive communication exchange with an agent via a first interaction mode, and the interactive communication exchange is based on a user inquiry. The interactive communication exchange is monitored and a determination is made that a consultation service would facilitate resolution of the user inquiry. A service resource is associated with the service session responsive to determining that the consultation service would facilitate the resolution; the service resource provides consultation to the agent via a second interaction mode without exposing the consultation to the user equipment. The consultation elevates an experience level employed in the first service session towards resolution of the user inquiry.

20 Claims, 13 Drawing Sheets

Related U.S. Application Data continuation of application No. 15/201,271, filed on Jul. 1, 2016, now Pat. No. 9,876,909.

(51) Int. Cl.
| | | |
|---|---|---|
| *H04M 1/64* | (2006.01) | |
| *H04M 3/51* | (2006.01) | |
| *H04L 12/58* | (2006.01) | |
| *H04L 12/18* | (2006.01) | |
| *H04M 7/12* | (2006.01) | |

(52) U.S. Cl.
CPC ....... *H04M 3/5141* (2013.01); *H04M 3/5166* (2013.01); *H04M 3/5175* (2013.01); *H04M 7/1295* (2013.01)

(58) Field of Classification Search
USPC ............ 379/265.09, 265.11, 265.12, 265.05, 379/265.06, 88.01
See application file for complete search history.

(56) References Cited

U.S. PATENT DOCUMENTS

| | | |
|---|---|---|
| 7,013,001 B1 | 3/2006 | Felger et al. |
| 8,175,255 B2 | 5/2012 | Ruckart et al. |
| 8,649,499 B1 | 2/2014 | Koster et al. |
| 8,737,598 B2 | 5/2014 | Bruce et al. |
| 8,755,510 B2 | 6/2014 | Erbey et al. |
| 8,781,105 B1 | 7/2014 | Duva et al. |
| 8,799,113 B2 | 8/2014 | Markham et al. |
| 9,036,805 B2 | 5/2015 | Fan et al. |
| 9,106,748 B2 | 8/2015 | Conway et al. |
| 9,124,694 B2 | 9/2015 | Monegan et al. |
| 9,171,322 B2 | 10/2015 | Spievak et al. |
| 9,178,999 B1 | 11/2015 | Hegde et al. |
| 9,214,001 B2 | 12/2015 | Rawle |
| 9,450,901 B1 | 9/2016 | Smullen et al. |
| 9,621,728 B2 | 4/2017 | Mccormack et al. |
| 9,712,674 B2 | 7/2017 | Phelps et al. |
| 9,774,738 B1 | 9/2017 | Langley et al. |
| 9,848,082 B1 | 12/2017 | Lillard et al. |
| 2003/0018531 A1 | 1/2003 | Mahaffy et al. |
| 2003/0179876 A1 | 9/2003 | Fox et al. |
| 2004/0054743 A1 | 3/2004 | Mcpartlan et al. |
| 2004/0141508 A1 | 7/2004 | Schoeneberger et al. |
| 2004/0203629 A1 | 10/2004 | Dezonno et al. |
| 2005/0188007 A1 | 8/2005 | Warner et al. |
| 2005/0213743 A1 | 9/2005 | Huet et al. |
| 2006/0080130 A1 | 4/2006 | Choksi et al. |
| 2006/0256953 A1 | 11/2006 | Pulaski et al. |
| 2007/0243861 A1* | 10/2007 | Hutchings ............. H04L 12/287 455/414.3 |
| 2008/0007206 A1 | 1/2008 | Velissaris et al. |
| 2008/0165942 A1 | 7/2008 | Provenzale et al. |
| 2009/0228264 A1 | 9/2009 | Williams et al. |
| 2009/0245500 A1 | 10/2009 | Wampler et al. |
| 2009/0327441 A1 | 12/2009 | Lee et al. |
| 2010/0191658 A1 | 7/2010 | Kannan et al. |
| 2010/0246800 A1 | 9/2010 | Geppert et al. |
| 2010/0287131 A1 | 11/2010 | Church et al. |
| 2010/0332287 A1 | 12/2010 | Gates et al. |
| 2014/0098176 A1 | 4/2014 | Isaacs |
| 2014/0098949 A1 | 4/2014 | Williams |
| 2014/0126708 A1 | 5/2014 | Sayko et al. |
| 2014/0126715 A1 | 5/2014 | Lum et al. |
| 2014/0164106 A1 | 6/2014 | Naik et al. |
| 2015/0103137 A1 | 4/2015 | Eisenberg et al. |
| 2015/0181039 A1 | 6/2015 | Erhart et al. |
| 2015/0195406 A1 | 7/2015 | Dwyer et al. |
| 2015/0281454 A1 | 10/2015 | Milstein et al. |
| 2015/0319307 A1 | 11/2015 | Govindarajan et al. |
| 2015/0326722 A1 | 11/2015 | Thomson |
| 2016/0219149 A1 | 7/2016 | Krishnan et al. |
| 2016/0269349 A1 | 9/2016 | Bolinger et al. |
| 2016/0350699 A1 | 12/2016 | Vymenets et al. |
| 2016/0371756 A1 | 12/2016 | Yokel et al. |
| 2016/0381091 A1 | 12/2016 | O'Connor et al. |
| 2017/0013073 A1 | 1/2017 | Mendez et al. |
| 2017/0048170 A1 | 2/2017 | Smullen et al. |
| 2017/0134334 A1 | 5/2017 | Degaugue et al. |
| 2017/0163808 A1 | 6/2017 | Sayko |
| 2017/0251107 A1 | 6/2017 | Ristock et al. |
| 2017/0264746 A1 | 9/2017 | Milstein et al. |
| 2017/0272695 A1 | 9/2017 | Krishnamoorthy et al. |
| 2017/0310826 A1 | 10/2017 | Gunasekar et al. |
| 2018/0006978 A1 | 1/2018 | Smullen et al. |
| 2018/0007102 A1 | 1/2018 | Klein et al. |
| 2018/0007204 A1 | 1/2018 | Klein |
| 2018/0007205 A1 | 1/2018 | Klein et al. |
| 2018/0124245 A1 | 5/2018 | Klein et al. |
| 2018/0131808 A1 | 5/2018 | Klein et al. |

* cited by examiner

100

200

300

400

500

900

1100

US 10,367,942 B2

SYSTEM AND METHOD FOR ANALYTICS WITH AUTOMATED WHISPER MODE

CROSS-REFERENCE TO RELATED APPLICATIONS

This application is a continuation of U.S. application Ser. No. 15/860,066, filed Jan. 2, 2018, which is a continuation of U.S. application Ser. No. 15/201,271, filed Jul. 1, 2016 (now U.S. Pat. No. 9,876,909), which are incorporated herein by reference in their entirety.

FIELD OF THE DISCLOSURE

The subject disclosure relates to system and method for analytics with automated whisper mode.

BACKGROUND

Consumers may require assistance from time to time with products and/or services. Some consumers who have problems using a product or service may be in need of technical information or require technical support. Others may require assistance with a return merchandise authorization, a billing inquiry, a service change, and the like. Producers, merchants and/or service providers often recognize the importance of responding to such inquiries in a timely and effective manner. To that end, many provide a substantial investment that can include one or more of live agents, Interactive Voice Response (IVR) systems and/or web-based self-help resources to address customer inquiries in a timely and effective manner.

A call response process generally acquires information from a customer on a voice call, e.g., using a voice call center model. Such voice call centers generally utilize dedicated telephony equipment that routes calls to a proper team and transfers customer information from a telephone call distribution system to an agent. An IVR system can be utilized to prompt a caller and detect caller responses according to DTMF responses from key entries on user devices and/or voice responses. The IVR systems allow a call to be routed correctly in response or saying a correct keyword or keywords from a predetermined list.

While some call centers use circuit switched connectivity to provide a voice session between customers and agents, others use IP connectivity to carry voice packet streams over a UDP channel, e.g., using a standardized protocol such as RTP. These so-called IP call centers use IP technology with a dedicated packet voice channel that essentially emulates a circuit switched call.

BRIEF DESCRIPTION OF THE DRAWINGS

Reference will now be made to the accompanying drawings, which are not necessarily drawn to scale, and wherein.

DETAILED DESCRIPTION

Figure 1:
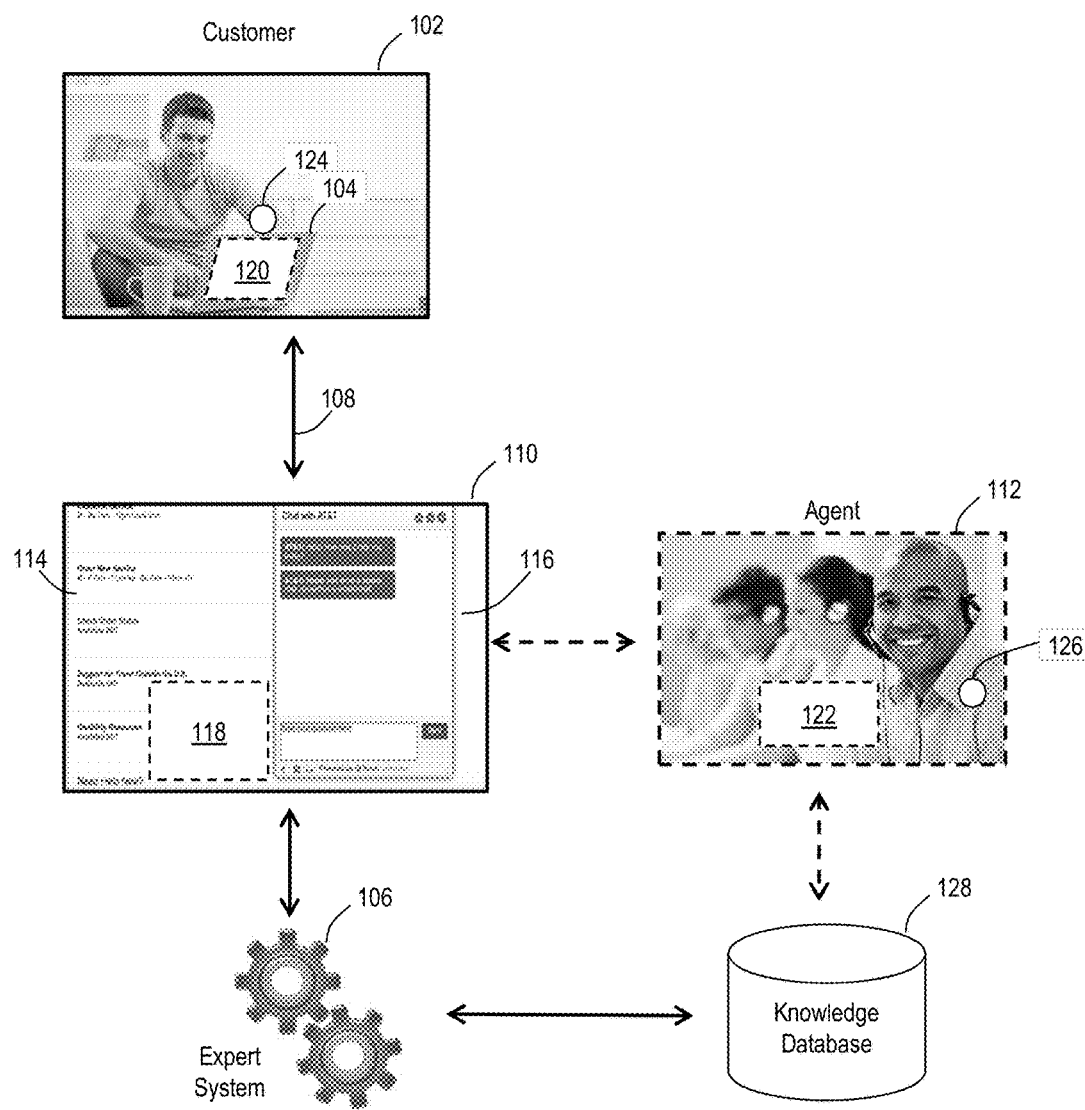
FIG. 1 depicts an illustrative embodiment of a customer contact system.

The subject disclosure describes, among other things, illustrative embodiments of an omni-channel, e.g., chat, voice, web, video, online contact capability that manages customer contacts through an expert system. An automated virtual agent can interact in real-time with a customer, intelligently route requests, as needed to a human agent and iteratively learns from real-time interactions between the customer and the human agent in order to facilitate future contacts either with this same customer or other customers who have similar requests. The system has the ability to rapidly automate manual processes based upon ongoing interactions. Other embodiments are described in the subject disclosure.

This application is related to the following commonly-owned U.S. patent applications each filed on even date herewith and each incorporated herein by reference in its entirety: Ser. No. 15/201,243 entitled "Omni Channel Customer Care System And Method"; Ser. No. 15/201,256 entitled "System and Method for Transition Between Customer Care Resource Modes," and Ser. No. 15/201,263 entitled "Customer Care Database Creation System and Method."

One or more aspects of the subject disclosure include a process that includes facilitating, by a system comprising a processing system including a processor, a first interactive customer service session via an internet protocol network, wherein customer equipment participates in a first interactive communication exchange with a first customer service agent via a first interaction mode of a plurality of interaction modes. The first interactive communication exchange is based on a customer inquiry. The first interactive communication exchange is monitored, and a determination is made that a consultation service would facilitate resolution of the customer inquiry based on the monitoring. A customer care service resource is associated with the first interactive customer session responsive to the determining that the consultation service would facilitate a resolution of the customer inquiry, wherein the customer care service provides the consultation service to the customer service agent via a second interaction mode of the plurality of interaction modes, without exposing the consultation service to the customer equipment, and wherein the consultation service elevates an experience level employed in the first interactive customer service session towards the resolution of the customer inquiry.

One or more aspects of the subject disclosure include a system including a processing system having a processor and a memory that stores executable instructions. The executable instructions, when executed by the processing system, facilitate performance of operations that include facilitating a first service session via a packet switched network, wherein user equipment participates in a first interactive communication exchange with a first agent via a first interaction mode of a plurality of interaction modes. The first interactive communication exchange is based on a user inquiry. The first interactive communication exchange is monitored and a determination is made that a consultation service would facilitate resolution of the user inquiry based on the monitoring of the first interactive communication exchange. A service resource is associated with the first service session responsive to the determining that the consultation service would facilitate a resolution of the user inquiry, wherein the service resource provides the consultation service to the first agent via a second interaction mode of the plurality of interaction modes, without exposing the consultation service to the user equipment, and wherein the consultation service elevates an experience level employed in the first service session towards the resolution of the user inquiry.

One or more aspects of the subject disclosure include a machine-readable storage medium, including executable instructions that, when executed by a processing system including a processor, facilitate performance of operations. The operations include facilitating a first service session via a packet switched network, wherein user equipment participates in a first interactive communication exchange with a first agent via a first interaction mode, wherein the first interactive communication exchange is based on a user inquiry. The first interactive communication exchange is monitored and a determination is made that a consultation service would facilitate resolution of the user inquiry. A service resource is associated with the first service session responsive to the determining that the consultation service would facilitate a resolution of the user inquiry, wherein the service resource provides the consultation service to the first agent via a second interaction mode of the plurality of interaction modes, without exposing the consultation service to the user equipment, and wherein the consultation service elevates an experience level employed in the first service session towards the resolution of the user inquiry.

Companies are trying to transform manual processes, in which a company-employed agent must act on behalf of a customer, into automated processes, in which customers are able to act on their own using self-service via a website. Such sites are often difficult for customers to navigate and confusing for many users. When customers are unable to complete self-service tasks successfully they become dissatisfied and may switch providers. Customers who have problems using a product or service may need a way to get technical information or may require technical support, return merchandise authorizations or other help, normally requiring an agent. In these scenarios web solutions and automated assistants only get in the way delaying resolution of the pending issue and often alienating customers.

Customers with complex billing issues may need questions answered. Often, it is impossible to make human agents available quickly to these customers, especially during the busiest times of day or during a busy season. Training sufficient agents and staffing call centers to the level necessary to deal with all possible issues is very costly and sometimes impossible because of unpredictable spikes in traffic. The result is that business is lost because customers don't understand how to use a product or cannot get prompt service.

Voice call centers are very expensive to maintain both because of the high cost of agents and because of the extensive amount of telephony equipment required to route calls to the proper team and to transfer customer information from a telephone call distribution system to the agent when a customer call comes in. Even with adequate systems and adequate agents, the process of acquiring information from a customer on a voice call is awkward and error prone as it depends upon an IVR (Interactive Voice Response) system to prompt the user and depends on the user pressing the right DTMF (Dual Tone Multiple Frequency) buttons in response or saying the correct keywords to route the call correctly.

Trying to recast this traditional customer care interaction to an automated system would be beneficial from a cost perspective but is rarely successful because of the complexity of anticipating all possible questions and issues and preparing adequate responses to each. Intelligent virtual agents (expert systems) are also difficult to program with the correct rules because customer problems are often transitory or localized and it is difficult to anticipate the questions for which responses are needed. Laborious programming and extensive testing generally required for custom software makes it impractical to build adaptable, responsive and useful automation.

The techniques disclosed herein utilize a web-based media routing system to connect a customer to an expert system. Web-based media routing systems, such as the World Wide Web Consortium (W3C) Web Real Time Communications (Web RTC), support an interactive, multimedia session, e.g., using a web browser, so that the customer interface can be highly customized to the needs of the business or application. When a customer initiates a contact they can be admitted to a virtual multimedia "room" that allows them to speak and/or chat message with the expert system.

The expert system is configured to analyze the customer's inquiry or question in order to identify a resolution. In some embodiments, the system analyzes the customer's inquiry using natural language processing and/or speech recognition. The resolution can include a list of topics that correlate to the customer's question or problem.

In at least some embodiments, the expert system searches a knowledge base using the list of topics as keywords to find rules that relate to the customer's message and/or utterance. The rules can be used to formulate a response to the customer's inquiry. If there is a suitable response in the knowledge base, the expert system can send the response to equipment of the user as a text document, a hypertext link, a voice message, a video or any combination thereof. If there is no suitable response in the knowledge base, the expert system can invite another customer service resource, such as a human agent, to join the communication exchange or otherwise enter the virtual multimedia room. Depending upon the desired behavior, the agent can by one or more of various contact modes including, without limitation, chat-messaging with the customer, speaking with the customer, video chatting with the customer or any combination thereof.

In at least some embodiments, when a live agent is interacting with the customer, the expert system records the session in an archive, e.g., identifying keywords that occur within the interactive session with the agent and associating these keywords with the recorded session. At an end of the interaction, the customer satisfaction with the session is rated and, if the session is deemed satisfactory, the recorded session can be "cleansed," e.g., using a manual and/or automatic anonymization process. Alternatively or in addition, the recorded session, e.g., the cleansed recorded session, can be edited for relevance. The session is then added to a knowledge base to be used in an automatic response for future sessions using at least some of the associated keywords as a means of rating the topics of recorded sessions.

A feedback process can be established, e.g., through the recordings and/or the customer rating, that allows each successful manual interaction to be converted to a contribution to the knowledge base. A future caller can be presented by the expert system with a previously recorded session based upon, for instance, a similarity of keywords, e.g., an edited and/or cleansed version. If the caller is unsatisfied with the response, they can be passed to a live agent and the process can be repeated. Over time, each session can be replaced with more satisfactory results. In this way, a knowledge base of satisfactory interactions is developed, and continuously improved.

FIG. 1 depicts an illustrative embodiment of a customer service or contact system 100. A user or customer 102 using customer equipment 104 accesses a customer service system 106 by way of a data network connection 108. The customer equipment 104 can include, without limitation, a workstation, a mobile device, e.g., a smart phone, a tablet or a laptop, and/or another device such as a media processor or set-top box, an Internet Protocol (IP) or smart TV. The customer service system 106 facilitates access to an interactive customer service session 110 by the customer equipment 104.

The customer service session 110 facilitates an exchange of information between the customer 102 and a customer service provider. In more detail the exchange of information can be between the customer 102 and one or more of an expert system of the customer service system 106, e.g., an intelligent software agent or "bot," and a live, human agent 112.

The customer service session 110 can support a presentation of customer service information 114, such as a form, a template, a frame, and/or a menu. Alternatively or in addition, the customer service session 110 can facilitate a presentation of a chat window 116 and/or a graphic window, such as an image or video window 118. For example, the image or video window 118 can include a screen shot of at least a portion of the user's screen 120 and/or a screen shot of at least a portion of the live, human agent's screen 122. It is generally understood that the live, human agent 112 accesses the customer service session 110 through agent equipment, e.g., a work station, a mobile device, such as a tablet, a laptop and/or a smart phone.

In at least some embodiments, the customer service session 110 exchanges one or more of audio or video from one or more of the user equipment 104, e.g., acquired by the user's camera and/or microphone 124, or the live, human agent's equipment, e.g., by the agent's camera and/or microphone 126.

The system 100 can include a knowledge database 128. The knowledge database 128 can maintain records related issues, inquiries and resolutions. For example, the knowledge database can include a predetermined list of likely issues and/or inquiries accompanied by corresponding resolutions and/or answers. It is understood that the knowledge database 128 can be updated or otherwise modified from time to time, e.g., as new issues are encountered and resolved. In some embodiments, the knowledge database 128 is updated in real time or in near real time, e.g., in response to resolution of an issue during a customer service session 110.

By way of illustrative example, a customer 102 accesses a customer care session 110 to seek resolution of an issue, e.g., an equipment-related issue, a service-related issue, a billing-related issue, and the like. The expert system 106 determines the customer issue and accesses the knowledge database 128 to identify a predetermined resolution. To the extent the predetermined resolution is identified to the particular customer issue, the expert system, e.g., using an automated agent or bot, provides the predetermined resolution to the customer 102 using the customer service session. However, to the extent that a predetermined resolution is not available or identifiable in the knowledge database 128, the automated agent can engage a live, human agent 112. Engagement can include joining the live agent to the existing session with the automated agent, or in place of the automated agent as in a handover.

The live, human agent 112 alone or in combination with still other customer service resources, e.g., a supervisor agent or subject matter expert, works with the customer 102 to resolve the customer's particular issue. Unlike other expert systems, those sessions engaging a live, human agent 112 to address new issues can be used to update the knowledge database 128. For example, the human sessions can be recorded and/or analyzed or processed to determine a corresponding template. The template can include standard information, such as equipment type, service type, equipment location, equipment network location, software, e.g., app and/or OS (operating system) versions and the like. Alternatively or in addition, the templates can include one or more of an issue category, a resolution, and/or list of alternative resolutions, and/or a list of likely resolutions. The resolutions can include statements, scripted question/answers, software, and the like. The templates can be used to address future questions in a rapid feedback loop. For example, the templates can be added to the knowledge database to allow future questions of the same or similar nature to be addressed by the automated bot, without having to engage a live, human agent.

As a web solution, existing customer authentication methods can provide knowledge about the caller, his or her previous orders or questions and details of their account without having to depend upon a touchtone (DTMF) entered account number or the telephone number of the caller as is done on conventional call center equipment. This is often error-prone. As no telephony equipment is involved, agent workstations can be entirely web based, requiring no special integration with call center infrastructure.

In addition to finding answers in the knowledge base 128, the expert system 106 can be used to easily route VoIP calls to live agents 112 based upon the nature of the question, or the identity of the caller. The expert system 106 can be configured with rules to send a customer 102 to the same agent 112 on multiple calls, such as a personal banker in the case of financial services contact management.

The customer service session 110 can be implemented using WebRTC, e.g., providing a dedicated WebRTC channel in response to the user's inquiry. The expert system 106 can respond via the WebRTC channel with text messages, hypertext, stored videos or other digital content which may be delivered to a web client.

In some instances the customer service session 110 includes a virtual location or room. By allowing the WebRTC platform to utilize a virtual room concept or model, customers can easily be engaged with multiple company endpoints at the same time (e.g., the expert system, a live agent, a supervisor/monitor, recording or playback functions).

In some embodiments, the customer's room can be maintained and/or archived. Such maintenance or archiving can be provided indefinitely, or according to a time limit or threshold. A time limit may be set for a number of minutes, hours, days, weeks, and the like. Often times, a customer who contacts the customer service for one issue may subsequently re-contact the service again in relation to the same or similar issue.

By way of example, a triple-play customer who subscribes to voice, data and cable service may have an issue with one of the services, e.g., cable. Resolution of the issue in a first customer service session may require a re-setting, power-cycling, and/or replacement of a hardware item. Such actions may interrupt the customer's communication exchange with the customer service. By maintaining the customer's room, the customer can be redirected or otherwise routed to the pre-established room after the momentary interruption. Other customer care resources associated with the room can maintain their association, e.g., in anticipation of a re-connection of the customer equipment. Records, such as customer records, records of progress towards resolution, and so on can remain available to the associated resource(s). To the extent the communication exchange of the session is being recorded, recording can continue after the interruption. By preserving many, most or all of the features of the earlier session, any inconvenience to the customer is minimized, improving the customer's overall experience and preferably facilitating a speedy and successful resolution to the issue.

It may be impractical to maintain association of at least some resources, such as live, human agents in at least some situations. Accordingly, preservation of a session and/or any associations to the session can be conditional. Conditions can include responding to requests by a customer, e.g., the customer places customer service session on hold to answer another call or tend to some other urgent, but momentary matter. Alternatively or in addition, conditions can include responding to requests of a customer service resource, such as the automated bot and/or live, human agent. Alternatively or in addition, still other conditions can be based on other factors, such as service outage reports, network traffic, resource utilization and/or availability, an identity of the customer, a level of subscription service of the customer, and so forth. Thus, a customer who has subscribed to a premium service and/or a customer who may have had a negative experience during an earlier customer service session, may be extended a convenience of preserving their room and/or association of one or more customer resources with their room.

In some embodiments, a virtual agent or bot can engage with the customer 102, while the customer is waiting for a live, human agent to come online. To this end, the bot can assist by finding and suggesting tutorials, videos and other content that may help the customer resolve the problem. The customer can peruse this content while waiting for a human agent to become available. It is foreseeable that at least some issues can be resolved by the virtual agent during a waiting period for the live agent.

Because the interaction is over a web-browser, the expert system 106 can compose responses that navigate the customer 102 to a web page where the customer can complete an automation process such as a provisioning step in activating the customer's service and can populate a hyperlink with form values which will then automatically populate the desired page. So the system can collect information from the user interactively and then direct the caller to a web-page with the form already filled in with all of the customer's information.

Figure 2:
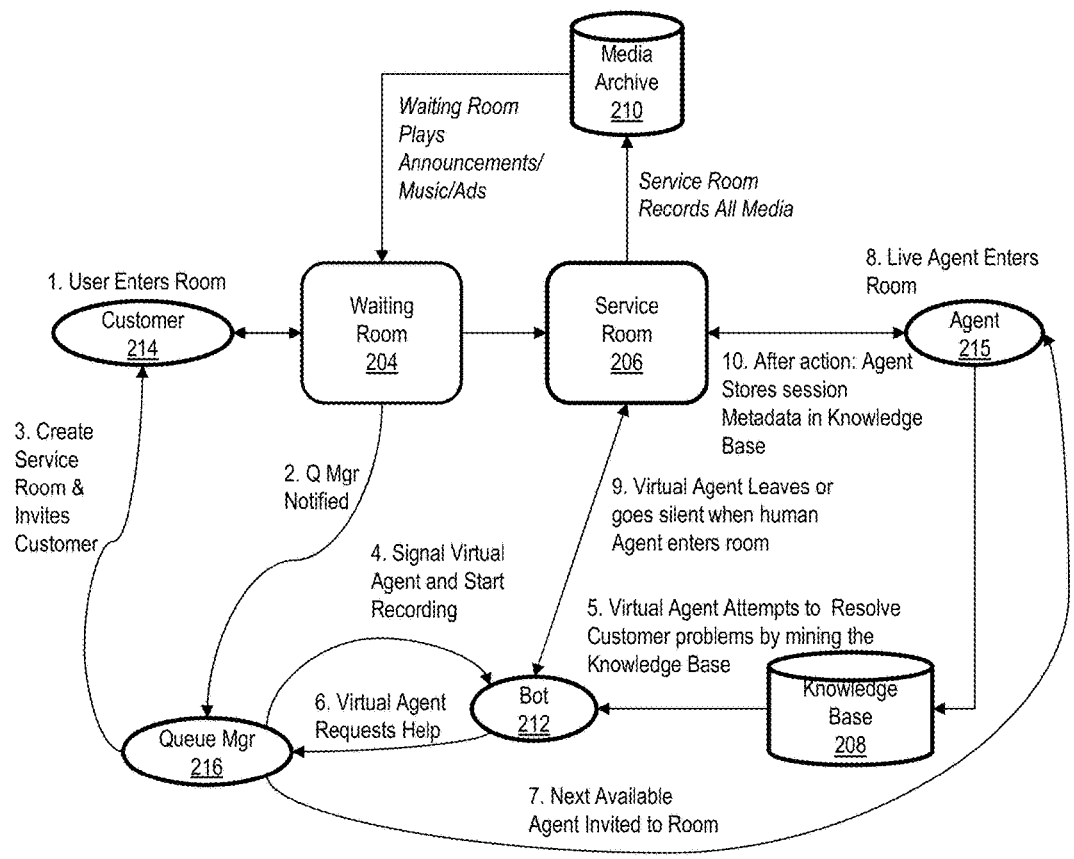
FIG. 2 depicts an illustrative embodiment of a contact center of the customer care service system of FIG. 1.

FIG. 2 depicts an illustrative embodiment of a contact center 200 of the customer care service system of FIG. 1. The contact center 200 includes a virtual waiting room 204, a virtual service room 206, a knowledge system 208, e.g., including a knowledge base, and in at least some embodiments, a media archive 210. Other contact resources include one or more automated software agents 212, or bots, and one or more live, human agents 215. A queue manager 216 receives service requests from one or more customers 214 and manages access and/or association of one or more of the contact center resources 204, 206, 208, 210, 212, 215.

The waiting room 204 can include a common resource that can be accessed simultaneously by multiple customers 214, e.g., entering and leaving at different or random times. By way of example, the waiting room can be accessed by a common address, such as a customer service center address or contact reference. A common address can include, without limitation, a telephone number, a network address, an IP address, a Uniform Resource Locator (URL) and the like.

The waiting room 204 can provide information that can be updated from time to time. In at least some embodiments, the waiting room 204 includes self-help resources, such as links to information related to common issues. Common issues may vary from time to time, e.g., as new equipment is introduced to a customer base, as software updates are implemented, and/or as various aspects of a network are modified. By way of example, the waiting room can include a web site or collection of one or more web pages accessible by a web address or uniform resource locator (URL). The waiting room 204 can be static or dynamic. For example, the waiting room 204 can include topical resources that can be arranged in a hierarchal manner and selectable by a customer to access further detail associated with any one topic. Links to self-help material can be included, e.g., such as links to text, audio and/or video.

A customer 214 can remain associated with or otherwise in the waiting room 204, while the customer 214 reviews the self-help material. Should the self-help material be sufficient, the customer 214 can leave or otherwise exit the waiting room 204 at any time. In this manner, a customer's time spent waiting for access to other resources can be productive, and in at least some instances, sufficient to resolve some customer inquiries and/or issues.

Continuing with an illustrative example, in a first step (1), a customer 214 enters the waiting room 204. In a second step (2), a queue manager 216 is notified that the customer 214 has entered the waiting room 204. In a third step (3), the queue manager 216 extends an invitation to the customer 214 to access a service room 206. In some embodiments, the queue manager 216 facilitates the service room 206 upon notification that the customer 214 has entered the waiting room. Alternatively or in addition, the queue manager 216 facilitates the service room 206 conditionally, e.g., upon acceptance of the invitation by the customer 214. For situations in which there is a delay in preparing the service room 206, the queue manager 216 can provide further notification that the service room 206 is ready or otherwise available. The customer 214 is then allowed to enter or otherwise directed or passed to the service room 206.

It is envisioned that the service room 206 can include an IP address associated with the customer. A port can also be assigned to which applications, communication exchanges the customer equipment and/or service center resources can be associated. One such example architecture includes WebRTC, which web browsers configured with WebRTC APIs can communicate. Other configurations include client-server scenarios, in which a client app, e.g., on the customer equipment access one or more server apps provided by the contact center 200. Still other configurations can include legacy telephony equipment and/or IVR systems. Although such legacy systems can be considered less desirable, situations can occur in which significant existing legacy resources can participate in at least some aspects of the solution, e.g., accessing a live agent 215.

Continuing with the illustrative example, in a fourth step (4), the queue manager 216 signals or otherwise facilitates an association of a virtual agent 212 with the service room 206. In at least some embodiments, a recording of the session begins. The recording can include recording of one or more of various contact modes used during the session, such as text chat, voice, video. In at least some embodiments, a virtual agent is always available so the customer never has to wait for a response.

In a fifth step (5), the virtual agent 212 attempts to respond to or otherwise resolve customer issue or problem. The virtual agent 212 can receive a customer inquiry by any of the one or more contact modes and analyze the customer inquiry, e.g., to determine the nature, category, topic, etc., of the particular issue or problem. The virtual agent 212 can utilize the knowledge base 208, e.g., by mining the knowledge base 208 for resolutions and/or responses to similar issues and/or inquiries.

To the extent that the virtual agent 212 can resolve the issue or problem, the session can terminate. It is understood that any termination can include a corresponding assessment. The assessment can include a customer assessment or rating, e.g., in which a customer responds to a question and/or completes a brief survey. Alternatively or in addition, the assessment can include a contact center rating, e.g., completed by the virtual agent 212. Assessments can be binary in determining whether the issue or problem was resolved or not. Alternatively or in addition, the assessments can be multidimensional to provide further insight into the success of the session, the customer's satisfaction, the contact center's perceived efficiency, and the like.

To the extent that the virtual agent 212 cannot resolve the issue or problem, the virtual agent 212 may requests the assistance of one or more additional resources in a sixth step (6). In the illustrative example, the virtual agent 212 requests the help of a live, human agent 215. The request is made to the queue manager 216. In a seventh step (7), the queue manager 216 invites a next available live, human agent 215 into the customer's virtual service room 206.

In an eighth step (8), the live, human agent 215 enters the customer's room 206. In a ninth step (9), the virtual agent 212 leaves the service room, or transitions into an inactive mode, e.g., "goes silent," responsive to the live, human agent 215 entering the room 206. Leaving the room 206 can include disassociating the virtual agent 212 from the customer's room 206, such that the virtual agent 212 is available to service other requests.

In at least some embodiments, the virtual agent 212 continues to monitor progress of the session, while in the inactive or silent mode. For example, the virtual agent 212 can assess communication exchanges by any of the one or more various contact modes to determine whether the customer is dissatisfied, whether the agent is not making sufficient or time progress, and the like. The virtual agent 212 can respond in one or more various manners to detecting that further assistance and/or escalation of the situation would facilitate resolution of the issue or problem. For example, the virtual agent 212 might act in an advisory manner, providing insightful recommendations and/or supporting information to the live agent 215. Such supplemental information can be provided via a separate or "side" communication channel between the virtual agent 212 and the live agent 215, without exposing the side channel to the customer.

The virtual agent can monitor other customer indicators, such as facial recognition indicators, voice or speech indicators and/or mood assessors, e.g., based on one or more of the image or audio feedback, to determine whether other customer care resources should be joined to the session, and/or other customer care strategies applied. For example, detecting a customer using a loud tone, speaking in an abrupt manner, and the like can be an indication of customer frustration that should be addressed or otherwise diffused as soon as possible. It is understood that any queueing can be modified to take into account a customer's reaction or mood, among other factors.

Alternatively or in addition, the virtual agent might submit a subsequent request to the queue manager 216 to invite a supervisory live, human agent or subject matter expert to participate in the session. The queue manager 216 can submit a request for a next available supervisor and/or subject matter expert to enter the service room 206. It may be helpful in at least some situations to also establish a communication channel between the live, human agent, the supervisor or subject matter expert and/or the virtual agent 212. Once again, this other or side channel can be shielded from the customer to allow for private communications between the participating service resources and without distracting from the communication exchange with the customer.

Although the illustrative examples refer to a single virtual agent and/or a single live agent servicing a single customer's room, it is envisioned that situations can occur in which more than one virtual agent and/or more than one live, human agents might service the same customer's room at the same time. Servicing can include participating in an active mode by participating in a communication exchange with the customer and/or participating in a standby mode in which the resource may not be participating directly in the communication exchange with the customer.

Continuing with the illustrative example, the service center 200 processes communication exchange between the customer, the virtual agent 212 and/or the live agent 215, supervisor, subject matter expert, and so forth. The analysis can identify various information related to the communication that are suitable for serving as metadata. This information can include, without limitation, identification of the issue or problem, e.g., according to one or more of a category or sub-category, associated equipment and/or services, unsuccessful solution attempts, participating agent(s), geographic location, network location, date, software versions, and the like. After the customer service session has concluded the complete recording and/or the resulting metadata can be stored, e.g., by the virtual agent 212, in the knowledge base 208.

Figure 3:
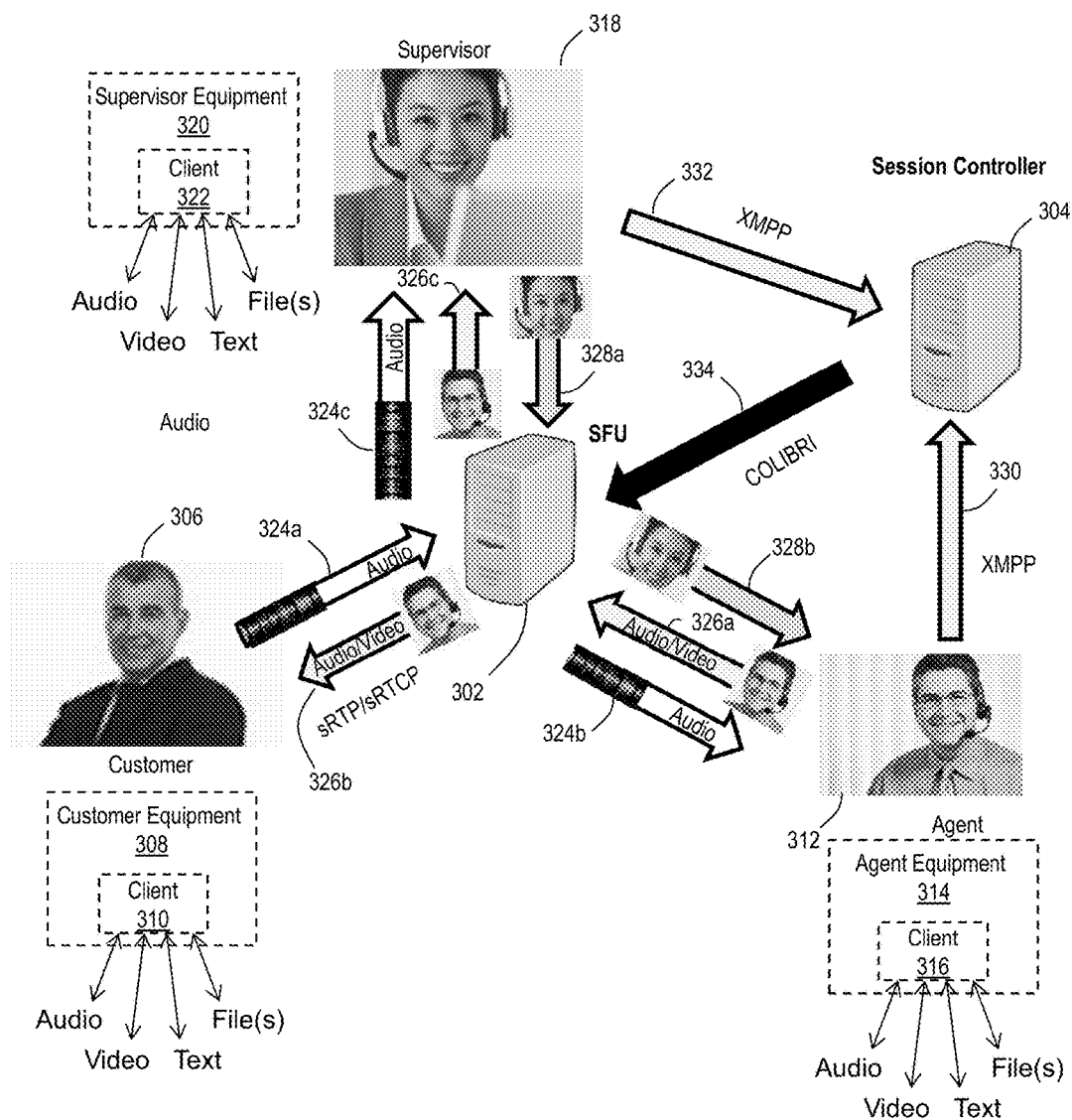
FIG. 3 depicts an illustrative embodiment of communication exchanges based on the customer care service system of FIG. 1 and/or the contact center of FIG. 2.

FIG. 3 depicts an illustrative embodiment of a customer service system 300 with detail of communication exchanges based on the capabilities of the customer care service system 100 of FIG. 1 and/or the contact center 200 of FIG. 2. The system 300 includes a Selective Forwarding Unit (SFU) 302 and a session controller 304. A customer 306 interacts with the system 300 by way of customer equipment 308. The customer equipment can include a client 310, e.g., a web browser that provides access to one or more of audio, video, text or files. A live, human agent 312 interacts with the system 300 by way of agent equipment 314. The agent equipment 314 can include a client 316, e.g., a web browser that provides access to one or more of audio, video, text or files. In at least some embodiments, a live, human supervisory agent or subject matter expert 318 interacts with the system 300 by way of supervisor equipment 320. The supervisor equipment 320 can include a client 322, e.g., a web browser that provides access to one or more of audio, video, text or files. Example web browser include without limitation, Microsoft Edge, Google Chrome, Mozilla Firefox, Opera, iOS Bowser, and Blackberry.

Information 324a from the customer is distributed by the SFU 302, e.g., in a first stream 324b to the agent equipment 314 and a second stream 324c to the supervisor equipment 320, if applicable. The information, or data streams 324a, 324b, 324c, can include audio, e.g., using VoIP, messaging protocols, e.g., based on SMS, MMS, chat, and more generally in any data stream. Alternatively or in addition, data streams can be used to share presentations, animations, keystrokes, mouse events, GPS coordinates, machinery, security or automotive metrics collection, etc. Information from the agent 326a, e.g., audio using VoIP, SMS, MMS chat, and the like are distributed by the SFU 302 in a stream 326b to the customer equipment 308 and in a stream 326c the supervisor equipment 320, if applicable. In at least some embodiments, information from the supervisor agent 328a, e.g., audio using VoIP, SMS, MMS chat, and the like are distributed by the SFU 302 in a stream 328b to the agent equipment 314. The supervisor agent stream can be directed to the agent 312 to the exclusion of the customer 306, as shown. Alternatively or in addition, the supervisor agent stream can be directed to the agent 312 and to the customer 306. It is envisioned that changes to the direction and destination of any of the communication streams can be altered or otherwise redirected during the course of a customer service session. Alternatively or in addition, the SFU 302 can allow for an independent selection of media streams, e.g., based on content type. By way of example, a customer may elect to receive audio only, while the live agent sends audio and video simultaneously. Each media stream can be independently defined and the SFU 302 can be set to forward only certain media types, such as the audio only, based on the customer's election.

Communications exchanges, without limitation, can be facilitated by Secure Real Time Transport Protocol (sRTP) to deliver real time audio and/or video over IP networks. Streaming media, can apply encryption, be subject to message authentication and/or integrity, and/or apply relay protection to data. For example, a unicast and or multicast RTP session is established for each multimedia stream. An RTP session is generally understood to consist of an IP address with a pair of ports for RTP and RTCP services. In some embodiments, a Secure Real Time Control Protocol (sRTCP) is used to control RTP session. This can include, without limitation, monitoring transmission statistics and quality of service (QoS), e.g., to aid in synchronization of multiple streams.

Continuing with the illustrative example, the agent equipment 314 and the supervisor equipment 320, if applicable, are in communication with the session controller 304 utilizing Extensible Messaging and Presence Protocol (XMPP) channels 330, 332. XMPP provides a communications protocol for message-oriented middleware based on XML that enables near-real-time exchange of structured yet extensible data between any two or more network entities. The session controller 304, in turn, is in communication with the SFU 302 utilizing a CoLiBri (Conferences with lightweight bridging) protocol channel 334. A CoLiBri specification defines an XMPP extension that allows real-time communications clients to discover and interact with conference bridges that provide conference mixing or relaying capabilities.

Figure 4:
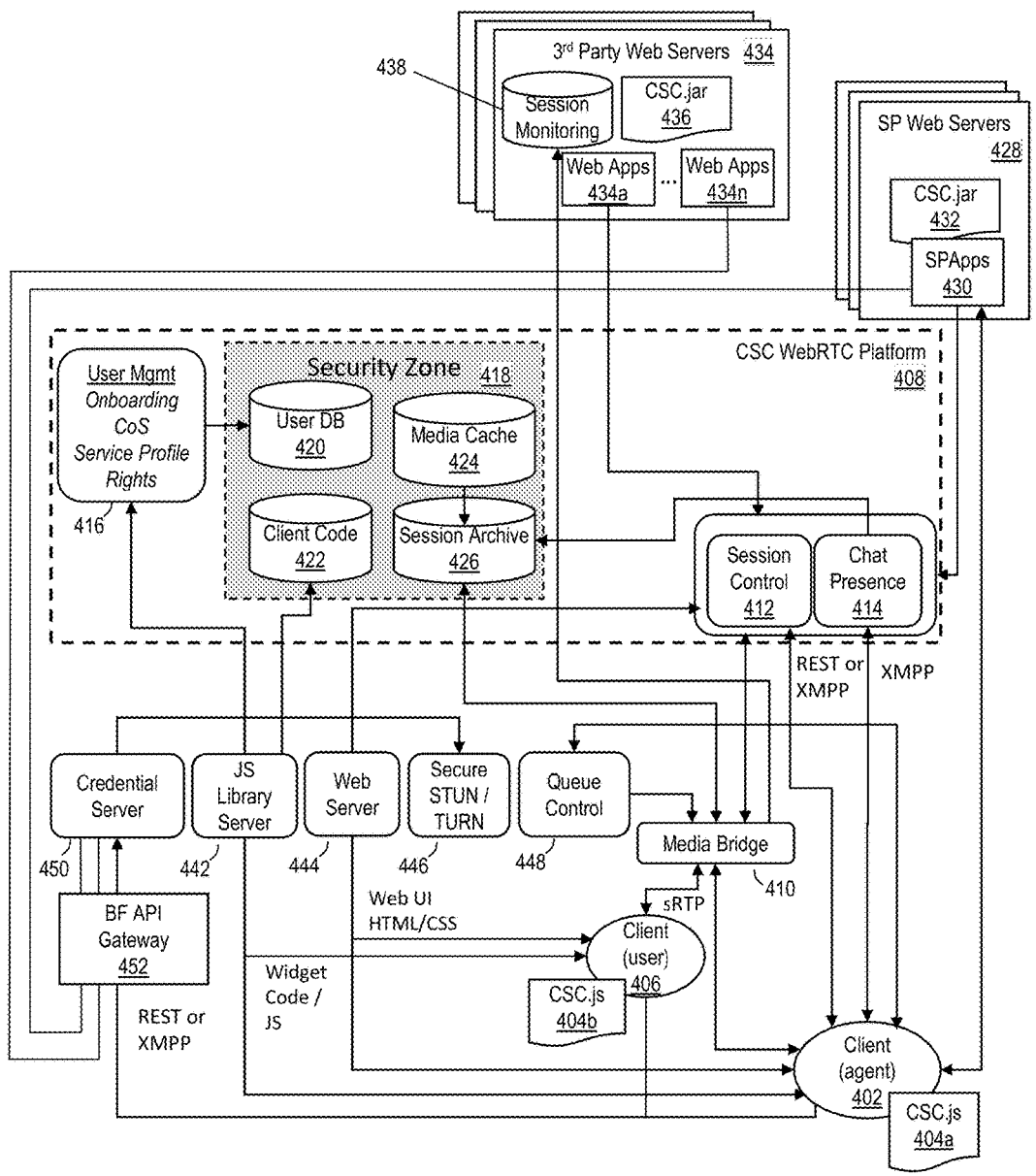
FIG. 4 depicts an illustrative embodiment of an example customer care service system of FIG. 1 and/or contact center of FIG. 2.

FIG. 4 depicts an illustrative embodiment of an example customer care service system 400 of FIG. 1 and/or contact center of FIG. 2. The system 400 includes a client agent 402, configured with customer service center (CSC) Javascript resources 404a. A user client 406 also configured with CSC Javascript resources 404b interacts with or otherwise accesses a CSC WebRTC platform 408 by way of a media bridge 410. In some embodiments, the media bridge 410 provides functionality of the SFU 302 (FIG. 3). In some embodiments, the SFU 320 and the media bridge 410 can be considered as interchangeable. For example, an SFU 320 can be considered as a specific example of a media bridge 410, e.g., serving as a lightweight and easily managed media bridge.

The WebRTC platform 408 includes a session controller 412, a chat presence controller 414, a user management module 416, and a security zone 418. The security zone 418 includes a user database 420, a client code repository 422, a media cache 424 and a session archive 426.

The system 400 can include or otherwise interact with one or more service provider web servers 428, each hosting one or more service provider apps 430 that can include Java archive resources 432 designed to allow interaction with the WebRTC platform 408. Likewise, the system 400 can include or otherwise interact with one or more third party web servers 434, each hosting one or more service provider apps 434a . . . 434n that can include also Java archive resources 436 provided to allow interaction between the service provider apps 434a-n and the WebRTC platform 408, and session monitoring database 438.

In at least some embodiments, the system includes one or more additional servers of functional modules, such as a credential server 440, a Javascript library server 442, a web server 444, a secure STUN/TURN server 446 and a queue controller 448.

Although WebRTC enables peer-to-peer communications, servers can be used to support client exchanges of metadata, e.g., to coordinate communication. Such exchanges can include signaling that can provide, among other services, means for coping with network address translators and firewalls. In more detail, signaling can include, without limitation, session control messages used to open or close communication, error messages, media metadata such as codecs and codec settings, bandwidth and media types, Key data, e.g., used to establish secure connections, network data, such as a host's IP address and port as seen by the outside world, and the like.

Peer discovery can be accomplished, e.g., by telephone numbers and directories for telephone calls. Presence management systems can be used for online video chat and messaging and as a means for users to initiate sessions. Initiating a WebRTC session can include one or more of an email or message that includes a URL.

WebRTC apps can use an Interactive Connectivity Establishment (ICE) framework to facilitate networking. For example, an application can pass ICE server URLs to an RTC Peer Connection. The ICE framework determines a path to connect peers and tries to make a connection using a host address obtained from a device's operating system and network card. If that fails, e.g., for devices behind network address translators (NAT), the ICE framework obtains an external address using a STUN (Session Traversal Utilities for NAT) server 446. A STUN server can be used to get an external network address. The STUN server uses a standardized set of methods and a network protocol that allows an end host to discover its public IP address if it is located behind a network address translator (NAT). If that fails, the traffic can be routed via a TURN (Traversal Using Relays around NAT) relay server 446. The TURN server uses a protocol that assists in traversal of NAT or firewalls for multimedia applications.

Figure 5:
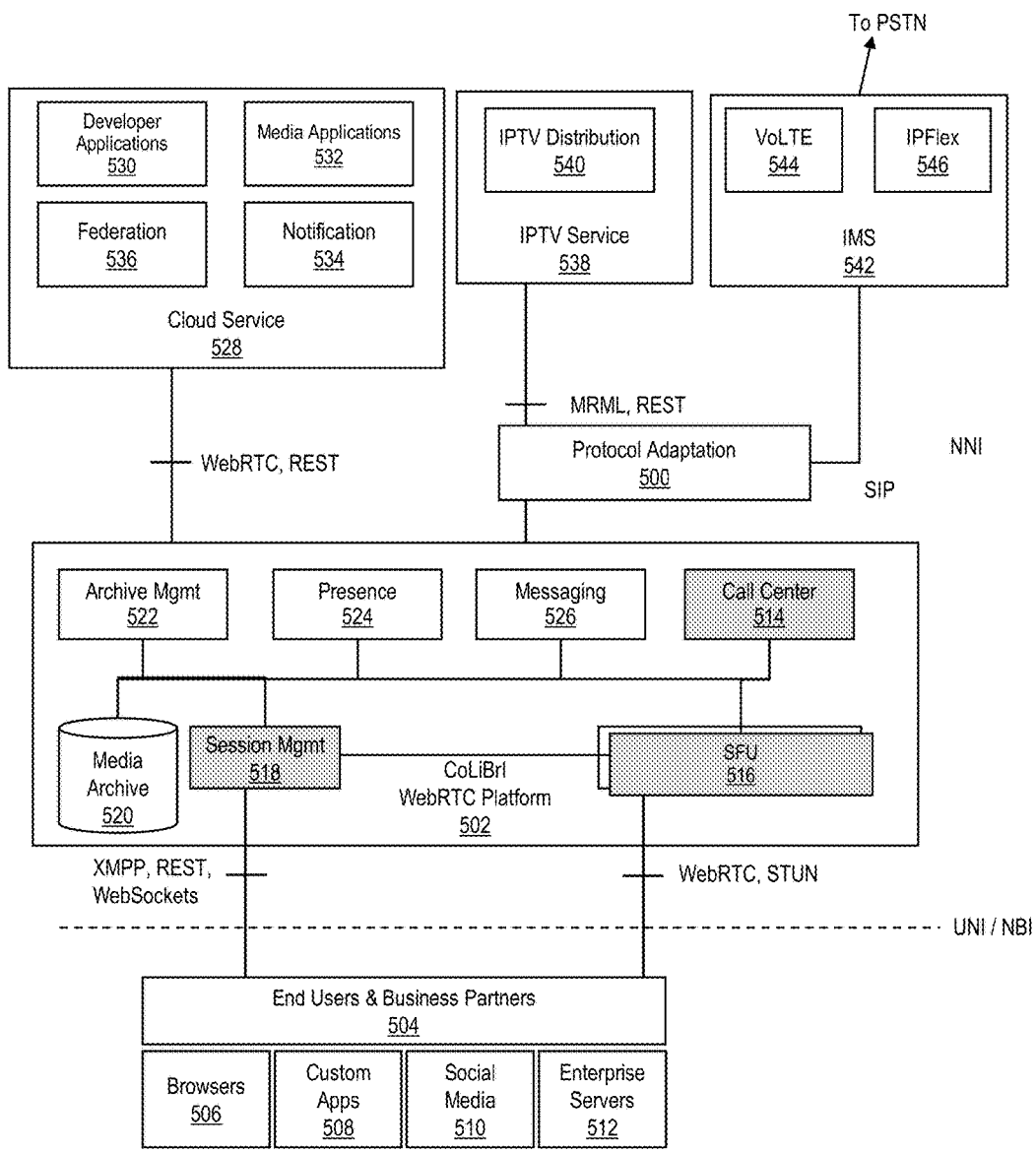
FIG. 5 depicts an illustrative embodiment of another example customer care service system of FIG. 1 and/or contact center of FIG. 2.

FIG. 5 depicts an illustrative embodiment of another example customer care service system 500 of FIG. 1 and/or contact center of FIG. 2. In particular, the example customer care service system 500 includes an open source based service platform. A WebRTC platform 502 is in communication with equipment of end users and/or business partners 504, e.g., that includes one or more of browsers 506, custom apps 508, social media platforms 510, or enterprise servers 512. The WebRTC platform 205 includes a call center 514, one or more SFU(s) 516 a session manager 518, and a media archive 520 in communication with an archive manager 522. Other features of the WebRTC platform 502 can include, e.g., a presence server 524 and one or more messaging servers 526.

In some embodiments, an interface to the WebRTC platform 502 can be provided by an external social media platform such as Facebook® or LinkedIn® or Tinder® or Twitter® social media applications. Such an interface allows users of social media to interact with the WebRTC platform 502 by way of the social media applications. For example, a customer might complain via a Twitter® social media application bout a particular product purchased from a particular department store. The complaint via the Twitter® social media application can be identified or otherwise detected, e.g., by a monitoring service, and evaluated to identify details, such as the particular department store and the complaining customer. A customer care agent or bot of the particular department store can react to the complaint by contacting the complaining customer, e.g., by way of the WebRTC platform 502, in an attempt to resolve the problem.

The session manager 518 and the SFU(s) are in communication with the equipment of the end users and/or business partners. For example, the system 500 utilizes WebRTC and/or STUN to manage interactions between the SFU and the end user and/or business partner equipment 504. Similarly, the system 500 utilizes XMPP and/or REST to manage interactions between the session manager 518 and the end user and/or business partner equipment 504.

In some embodiments, the WebRTC platform 502 is in communication with one or more other applications utilizing a cloud service 528. Examples include, without limitation, one or more of applications 530, media applications 532, notification services 534 or federation services 536. Applications 530 can include, without limitation, any conventional application built by a third party developer that runs on the cloud service. Media applications 532 can include, without limitation, any applications that process real-time media provided by the WebRTC platform 502, for instance, for speech recognition, or video analysis or for video enhancement (such as adding cat ears to a face on a video source or increasing contrast to compensate for poor lighting).

Alternatively or in addition, the WebRTC platform 502 is in communication with one or more of an IPTV service 538, e.g., providing an IPTV distribution service 540 or an IMS service 542, providing one or more of VoLTE services 544 or IPFlex services 546. In at least some embodiments, one or more protocol adapters 548 are provided between the WebRTC platform 502 and one or both of the IPTV service 538 or the IMS service 542. In at least some embodiments, the same protocol adapter 548 may not be suitable to adapt to both IPTV and IMS services should the media standards be different. Accordingly, the session manager 518 and/or the call center 514 can leverage one or more of the various available assets in planning, managing and executing customer care services.

Figure 6:
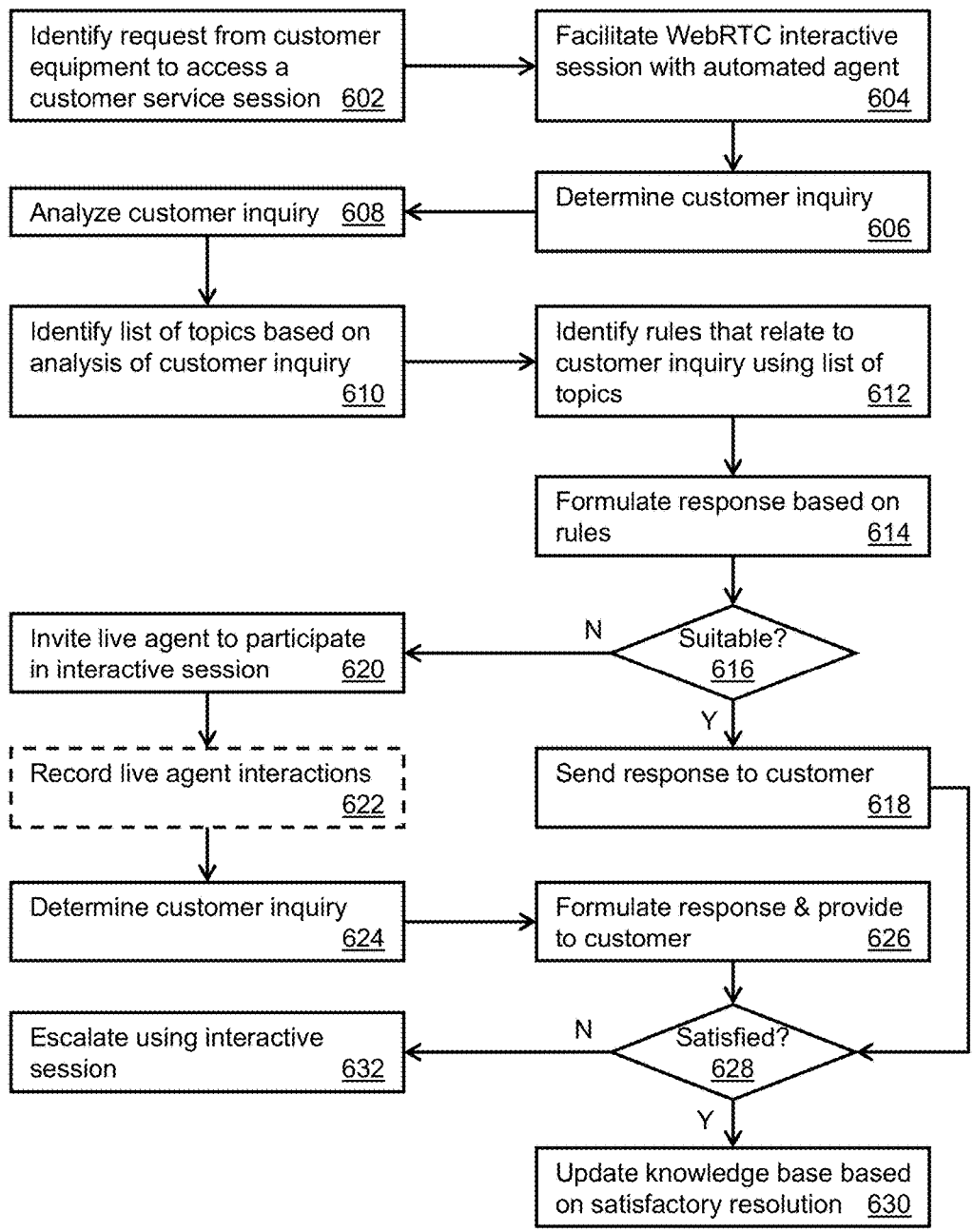
FIG. 6 depicts an illustrative embodiment of an example process used by the systems of FIGS. 1-4.

FIG. 6 depicts an illustrative embodiment of an example process 600 used by one or more of the systems 100-400 of FIGS. 1-4. The process 600 relates to an omni-channel customer care interface that supports a persistent customer care session. The persistent customer care session facilitates an exchange of information between customer equipment and one or more customer care resources according to one or more different contact or communication modes. Example contact modes include, without limitation, chat, voice, hypertext and video. Example customer care resources include, without limitation, an automated software agent or "bot," one or more different live agents, e.g., tech support, supervisors and/or subject matter experts.

In at least some applications, the persistent customer care session can be accessed by a sign-in, access and/or authorization process. When a single sign-in process is used, the single sign-in can be sufficient to access any combination of the customer service resources without requiring any further sign-in, access and/or authorization. In some applications persistent cookies can be used to establish and select persistent sessions. Persistent cookies can be used to keep users logged in over an extended period of time, e.g., allowing them to continue to access a particular web service regardless of the period of time since they last joined. This can be accomplished on the same machine and/or across multiple machines by using a browser that shares context, e.g., the Chrome® browser.

According to the omni-channel customer care interface, one or more customer care resources can be brought into the session at different times, as necessary. Moreover, any of the customer care resources can be brought in according to one or more of the various contact modes. Multiple customer care resources can be engaged at once, some actively and others passively to monitor the session. A private communication channel can be provided between customer care resources, for example, allowing live agents to communicate privately and share information during a session according to one or more of the various communication modes.

The customer can sign-on and enter a session via any one of the various communication modes. In some embodiments, an automated bot initiates a communications exchange with the customer equipment using the session. The bot can be configured to attempt an initial resolution without human interaction. To this end, the bot can implement a scripted or otherwise pre-programmed exchange with the customer to gather information. Information can be obtained from one or more of a user input or selection, e.g., via a user interface that can include a form and/or selectable lists of items. Alternatively or in addition, information can be obtained from one or more other sources, such as pre-existing records related to one or more of the user or customer, the customer equipment, subscribed services, account status, and the like. In at least some embodiments, information can be obtained from other sources not necessarily associated with a particular user. Such sources can include, without limitation, system and/or network status, other customer service calls, e.g., surging in relation to a widespread problem or issue, weather events, news events, and the like. In at least some embodiments, the automated bot accesses a solutions database in an attempt to resolve the issue, before escalating or otherwise associating a live, human customer care resource with the customer care session.

In some embodiments, the session accommodates seamless transitions or switches, without disturbing or otherwise redirecting the customer equipment from the session. Transitions can include, without limitation, changes between communication modes, e.g., transitioning from a text chat to voice, or from voice to video. Likewise, transitions can include engaging and/or disengaging different customer care resources, as necessary, e.g., introducing a live agent to the session initiated by a bot. In at least some embodiments, transitions include switching customer care resources from a passive mode to an active mode, or an active mode to a passive mode as required.

For example, an active bot participating in a communication exchange of an existing session with a customer may transition to an inactive mode upon introduction of a live customer service agent. At some point, e.g., after a problem has been identified and/or solved, the bot may be re-activated to once again participate in the communication exchange of the existing session. A customer care resource in an inactive mode can continue to monitor the session. Namely, the customer care resource can continue to track or otherwise follow state transitions of the session, information exchanged, progress or lack thereof of issue resolution, and the like, without actively participating in the communication exchange or otherwise altering the state.

The customer service session provides a single customer interface that brings resource(s) to the session as opposed to moving the customer and/or the session to the resource(s). This approach supports seamless transitions between customer care resources and communication modes, without disrupting or otherwise inconveniencing a customer being served. Information, such as the nature of the issue, customer equipment, subscribed service(s), account status, progress towards resolution and so forth can be maintained and shared among customer service resources as they join an active session and as they transition between active and passive modes in relation to the active session.

In the example process 600, a request from customer equipment to access a customer service session is identified at 602. The request can be made by any suitable means, such as an instant message, an SMS, an MMS, accessing a web site, an email, a VoIP call. In some embodiments, the request can be made by way of an application or app resident on a user's device, e.g., a mobile app. In some scenarios, the app includes a web client running on the user's device that communicates with a web server operated by the customer service provider and/or third party customer service provider. Alternatively or in addition, the request can be made using a web browser, e.g., using WebRTC APIs.

In the illustrative example, the process facilitates a WebRTC interactive session at 604. WebRTC can be used to enable web browsers with real-time communications via simple Javascript APIs. Features include acquiring media from customer equipment, e.g., by providing control of a customer's camera, microphone and/or speakers. WebRTC also supports peer-to-peer (P2P) connections, e.g., between a customer's web browser and one or more of an automated software agent, or bot, a customer service provider's server, or a web browser or server application of a live, human agent or subject matter expert. In some embodiments, a WebRTC gateway allows end users to access SIP based hosted PBX and call centers without a need to change these services.

The process, using a bot, determines a customer inquiry at 606. This determination can be based on one or more user inputs received from the customer equipment. By way of example, user inputs can include text, e.g., by way of an email, a chat message, or a text entry in a webpage or portal. Alternatively or in addition, user inputs can include voice, e.g., analyzed with a voice recognition service. In at least some embodiments, the customer inquiry can be determined according to a user selection from a predetermined list of issues and/or topics.

The customer inquiry is analyzed at 608. Analysis can include one or more of voice recognition, parsing of text messages, identification of selections based on predetermined listings, and the like. For analyses using voice recognition to obtain a textual representation, the resulting text messages can be further parsed and interpreted. In at least some embodiments, analysis includes identification of keywords. Keywords can be used to identify topical areas, such as billing, equipment, service, and the like. Customer inquiry analysis can include determining one or more ancillary features, such as a customer's identity, equipment type, service plan, account status, geographic location, network location, and the like.

One or more of the ancillary features can be obtained without necessarily making a request and/or interpreting a customer's communication. For example, a customer's identity, equipment type, service plan and account status and the like can be determined based on authentication and/or authorization of the customer as might be determined by an initial authorization process.

The process identifies a list of topics based on the analysis of the customer inquiry at 610. Rules that relate to the customer inquiry are identified at 612 using the list of topics. Rules can be pre-determined based on individual topics. Alternatively or in addition, at least some rules can be pre-determined based on a combination of topics. The rules can be used by one or more of the customer resources to address or otherwise resolve the customer's inquiry or issue. For example, the bot can apply the rules to request additional information from the customer, obtain additional information from the merchant or service provider and/or third party systems. Some rules can include analyses of ancillary information, such as network statistics, equipment performance history, customer account history, and the like. In some embodiments, the rules can include obtaining metrics and/or analytics based on the nature of the customer inquiry. In some embodiments the rules can include a scripted conversation. The scripted conversation can include a decision tree to facilitate resolution of the customer inquiry.

A response is formulated based on the rules at 614, and a determination is made at 616 as to whether the response is suitable or otherwise applicable. The response can be based on any of the foregoing, e.g., customer replies to questions posed by the bot, status of ancillary information, metrics, analytics, and the like. It is conceivable that one or more alternative responses can be identified, e.g., each with its respective probability or weighting.

Suitability of a response can be determined according to one or more measures. For example, if the response is identified with a relatively high degree of certainty, then it can be provided. A threshold or multiple thresholds of certainty or probability of suitability can be identified. If a particular response has an associated probability that exceeds the threshold, it can be provided. In some embodiments, the thresholds can be tailored or otherwise adjusted based on the customer's identity, records of past dealings, aggregate customer ratings, and the like.

In some embodiments, suitability is subjectively determined by the customer. They can indicate that they are not satisfied with a particular response, with the response process, with processing delay, and the like. A customer might say or text, "I'm not satisfied," or "that won't work" or "I want to speak to a live agent" or the like. Alternatively or in addition, the customer might select a menu item or button that indicates whether the customer is satisfied, problem resolved, or the like.

To the extent that the response is suitable, a response is sent to the customer equipment at 618. In some scenarios, the response can be identified with relative certainty. In other scenarios, the response may be accompanied by a probability or weighting. The bot can decide whether to provide the response, or to qualify the response based on the corresponding probability or weighting. When multiple alternative responses are possible, the bot can provide the alternative responses, e.g., prioritizing the responses according to their respective probabilities or likelihoods.

To the extent that the response is not suitable, a live agent is invited to participate in the interactive session at 620. Once again, the live agent joins an existing session, without any need to move the customer to another customer service session. The customer remains, e.g., in the same virtual room as the different resources are added, modified and/or removed.

The live agent can be invited by the bot or by a queue scheduler. A request for live agent can be initiated in response to a determination that the bot response is not suitable according to any of the foregoing examples. Alternatively or in addition, a request for a live agent can be made before suitability of any response is determined, and in some instances, before a response is determined. For example, a live agent might be requested upon initiation of the interactive session as a matter of course. The request can be entered into a queue and a live agent made available based on placement in the queue, agent availability, level of escalation of a session and the like. Should the agent become available, they may choose or be placed automatically in a monitor mode. Namely, the live agent can begin monitoring a session before entering by request or otherwise.

In some embodiments, the bot can determine when a live agent begins monitoring or is otherwise available to participate. The determination can be made in response to receiving a notice from a scheduler or queue manager, a communication and or acknowledgment of the same from the knowledge system and/or by the live agent making an announcement.

In some embodiments, the rules applied by the bot can vary depending upon availability of an agent. If the agent is available early on in the process, the bot may offer to transition to the live agent before determining any response. Alternatively, if the live agent is not available yet, e.g., delayed due to availability, the bot might prolong, e.g., stall, the automated portion of the customer service session if a resolution cannot be determined quickly. Such stalling tactics can keep the customer engaged in the solution process, without the customer necessarily being aware that they are waiting for a live agent to become available.

In at least some embodiments, the live agent interactions with the customer are recorded at 622. It is understood that in at least some embodiments, automated agent interactions with the customer can be recorded too. It is more likely, however, that the live agent interactions will occur for those issues that cannot be addressed swiftly or at all by the automated agent and the current knowledge base. As disclosed herein, the recorded interactions, and particularly the recorded live agent interactions, can be analyzed and used to update the knowledge base. Thus, the system includes a learning process whereby the knowledge base is updated based on a new solution worked out by the live human agent. With proper analysis and adoption, the knowledge base can be updated so that the same or similar problem, when encountered in the future, can be addressed by the automated agent and/or the knowledge base without having to engage a live agent for the same or similar problem.

The process includes another opportunity to determine the customer inquiry at 624, having the benefit of the live agent. The live agent alone, or in combination with one or more of the bot, the knowledge base, and/or other subject matter expert(s) works with the customer, and perhaps another agent or customer service resource, to identify a response. Ultimately, a response is formulated and provided to the customer equipment at 626.

Once again, a determination is made as to whether the customer is satisfied with the response at 628. The determination can include any of the foregoing techniques, including a subjective determination by the live agent.

To the extent that the customer is satisfied, a knowledge base is updated at 630 based on a satisfactory resolution of the customer inquiry. To the extent that the customer is not satisfied, the interaction can be escalated at 632 using the interactive session. Escalation can include joining a supervisor, a manager and/or another subject matter expert to the existing session. To the extent escalations occur, the process can repeat, e.g., from step 620.

Figure 7:
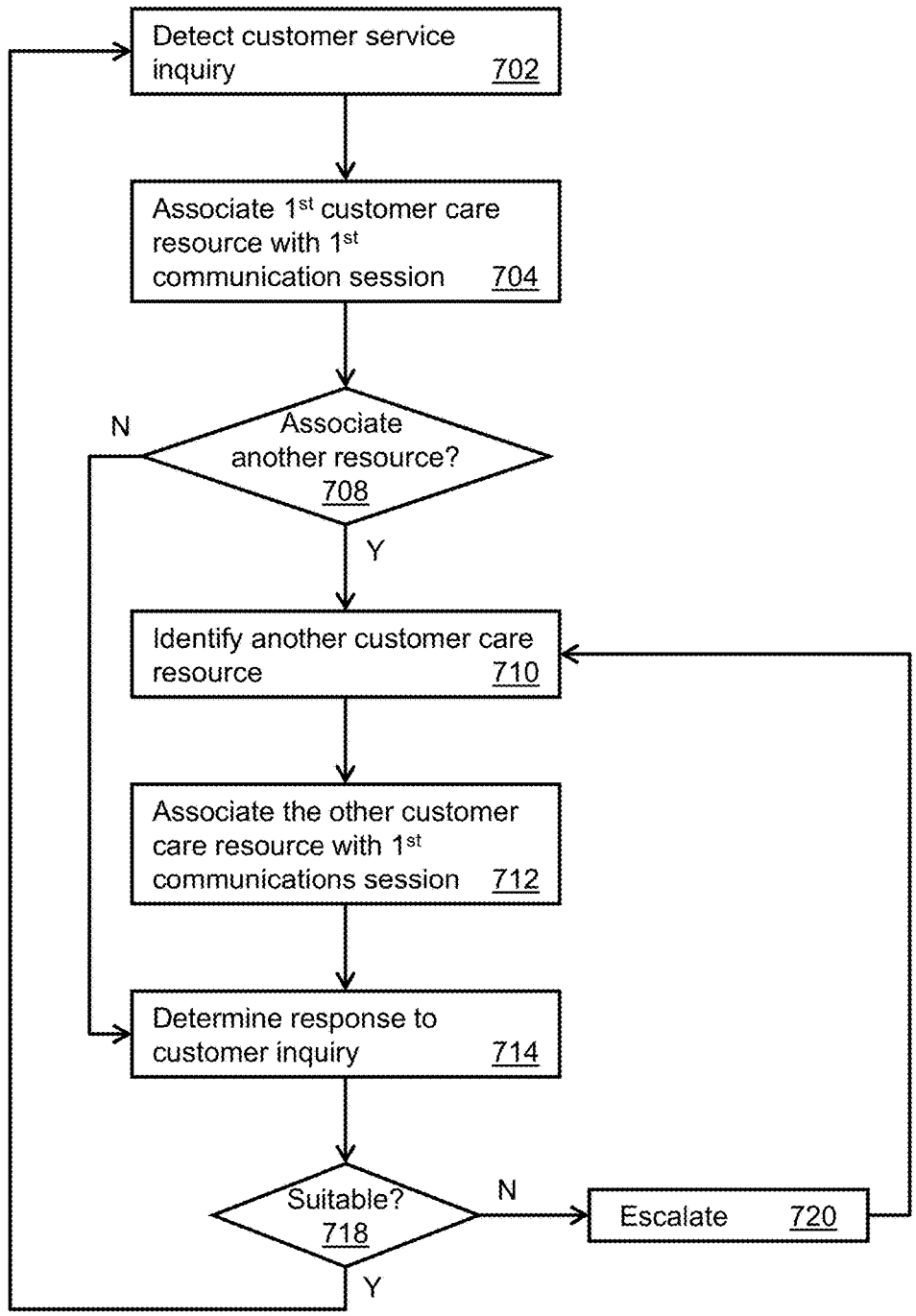
FIG. 7 depicts an illustrative embodiment of an example process used by the systems of FIGS. 1-4.

FIG. 7 depicts an illustrative embodiment of an example process 700 used by one or more of the systems of FIGS. 1-4. The process 700 includes adding and/or changing customer care resources associated with a customer care session. Generally, customer care resources can be added to a session in a number of different ways, such as: (a) self-identified, (b) resource availability driven, (c) soft transitions, and (d) automatically identified.

Self-identified transitions can occur when a customer care resource determines an escalation, de-escalation or media shift is necessary. For example an automated agent, or bot may determine that problem resolution is not available or has failed, choosing to route calls to live agents based upon the nature of the question, the skillset of the agent or the identity of the caller and caller information that indicates a previous agent on the same matter. In a further example, a first live agent participating in a customer care session may determine that a different live agent is required. Alternatively or in addition, a live agent monitoring a customer service session with a first live agent or a bot may take over the session from the first live agent or the bot. Other transitions include shifting from chat to voice, voice to video, live agent to bot with passive monitoring, etc.

Resource availability driven transitions can occur when customer care resources are employed temporarily until other resources are available. For example, a bot can be employed until a live agent becomes available.

Soft transitions can occur when a particular customer care resource "times-out." An automatic soft escalation can occur due to a presumed failure, with an escalated resource being added first as a monitor to the existing customer care resource. In this fashion, a live agent can begin monitoring a bot or a supervisor can begin monitoring a live agent, and so on. The escalated resource can take control and begin direct involvement—but only if necessary. The escalated resource would have an advantage of having been initially monitoring progress of the session, reviewing related information, and the like.

An automatically identified transition can be triggered by an automated session manager that runs in the background and reviews the session based on analytics (more than just time) to determine if escalation is required. For example, based on a score as to appropriateness of the knowledge base information and/or detection of keywords of user indicating a need for the customer to talk to a human, the system can escalate to a human agent. Further review of a session with a live agent can determine if escalation to a different live agent or supervisor is required. The escalation can be implemented via a soft transition as described above with passive monitoring implemented along with the option for the escalated resource to switch to active participation.

The process 700 detects a customer service inquiry at 702. A first customer care resource is associated with a first communication session at 704.

A determination is made at 706 as to whether another customer care resource should be associated with the first communication session. To the extent that the process determines that another customer care resource should be added, the process identifies the other customer care resource at 710. The other customer care resource is associated with the first communications session at 712, a response to the customer inquiry is determined at 714.

A determination is made at 718 as to whether the response is applicable or otherwise suitable. To the extent the response is suitable, the process continues by repeating for other customer service inquiries at 702. However, to the extent the response is not suitable, the process escalates at 720.

Figure 8:
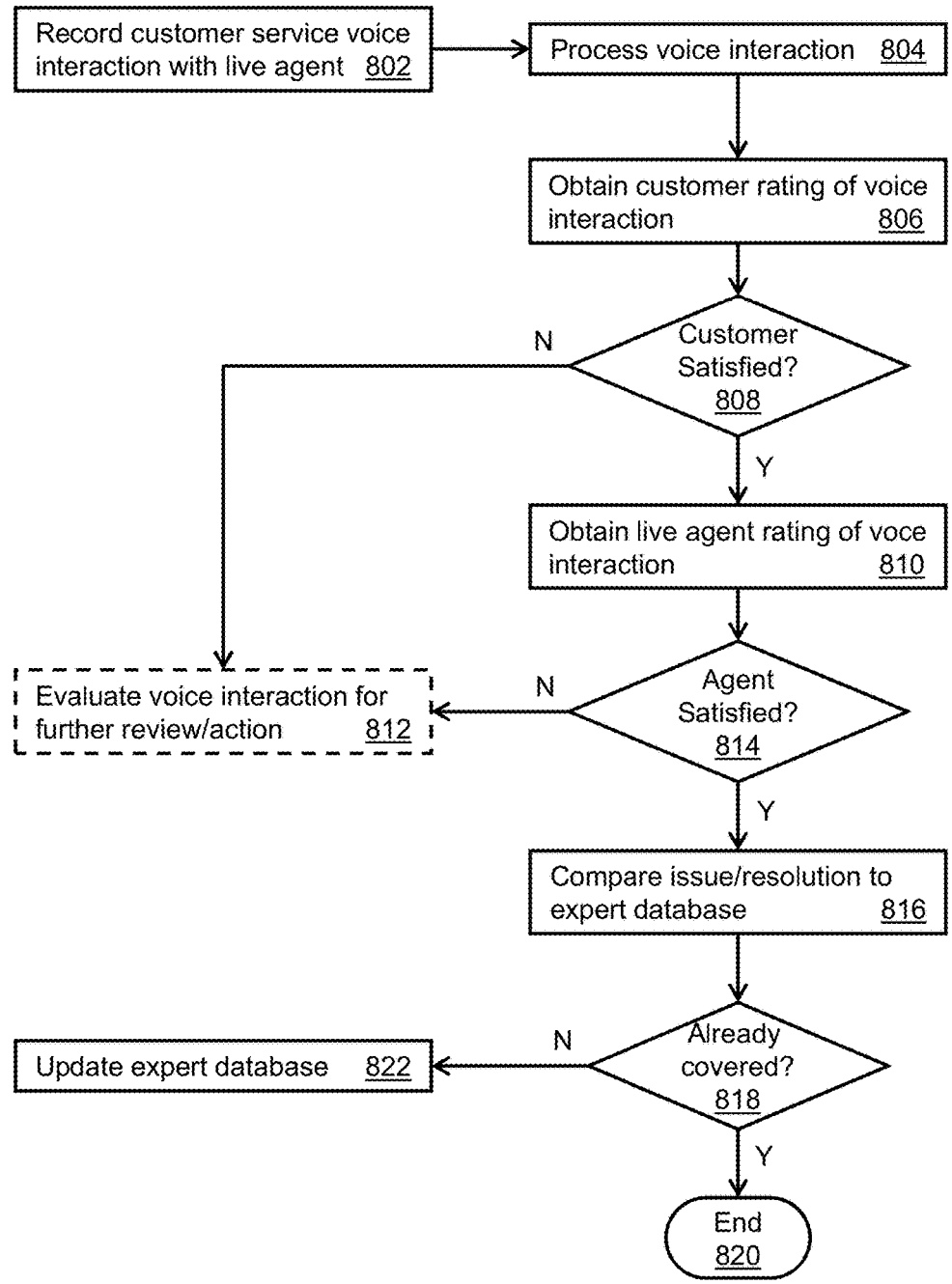
FIG. 8 depicts an illustrative embodiment of an example process used by the systems of of FIGS. 1-4.

FIG. 8 depicts an illustrative embodiment of an example process 800 used by the systems of FIGS. 1-4. While a live agent is interacting with a customer within the context of a customer service session, an expert system records the session. The recorded session can be stored in an archive. In some embodiments, keywords are identified within the interactive session with the agent. At a conclusion of an interaction, a customer satisfaction with the session is rated. Alternatively or in addition, agent feedback is obtained to determine if the session is deemed satisfactory. Further analysis can assess whether the session is different from other sessions already available in a database of the expert system. If so, the recorded session is processed and added to the knowledge base.

Processing can include anonymizing the data, e.g., to remove any customer sensitive personal information. The anonymized data can be further processed or otherwise cleaned to remove any unnecessary or "ugly" communications that took place in the prior session. Accordingly the data obtained from the recorded content is "cleansed" so it appears to be a favorable response to a particular product. For example, the cleansing process can remove unnecessary customer dialog like "hello? How are you," off-topic communications, disparaging comments, and the like.

The processing further includes automated metadata creation such as the keywords extracted from the exchange, a problem statement and category, geographical location of the customer, the service or product type, etc.

The processed session is put into a "golden database" of high-quality information from which a bot can use. When a bot is brought into a subsequent session, it has access to this data and can use it to address issues with customers as an automatic response that lays out a particular solution.

The process 800 records customer service voice interaction with live agent at 802. The voice interactions are processed at 804.

A customer rating of the voice interactions is obtained at 806.

A determination is made at 808 as to whether the customer is satisfied with the service response. To the extent that the customer is satisfied, live agent rating of the voice interaction are obtained at 810.

A determination is made at 814 whether the agent perceives that the customer's inquiry has having been satisfactorily addressed.

To the extent it is determined that the customer, the agent or both are unsatisfied, the voice interaction can be evaluated at 812 for further review and/or action.

To the extent it is determined that both the customer and the agent are satisfied, the issue/resolution is compared to an expert database at 816.

According to the comparison, a determination is made at 818 as to whether the same or similar issue has already been covered. To the extent that the same or similar issue has not already been covered, the expert database is updated at 822.

Figure 9:
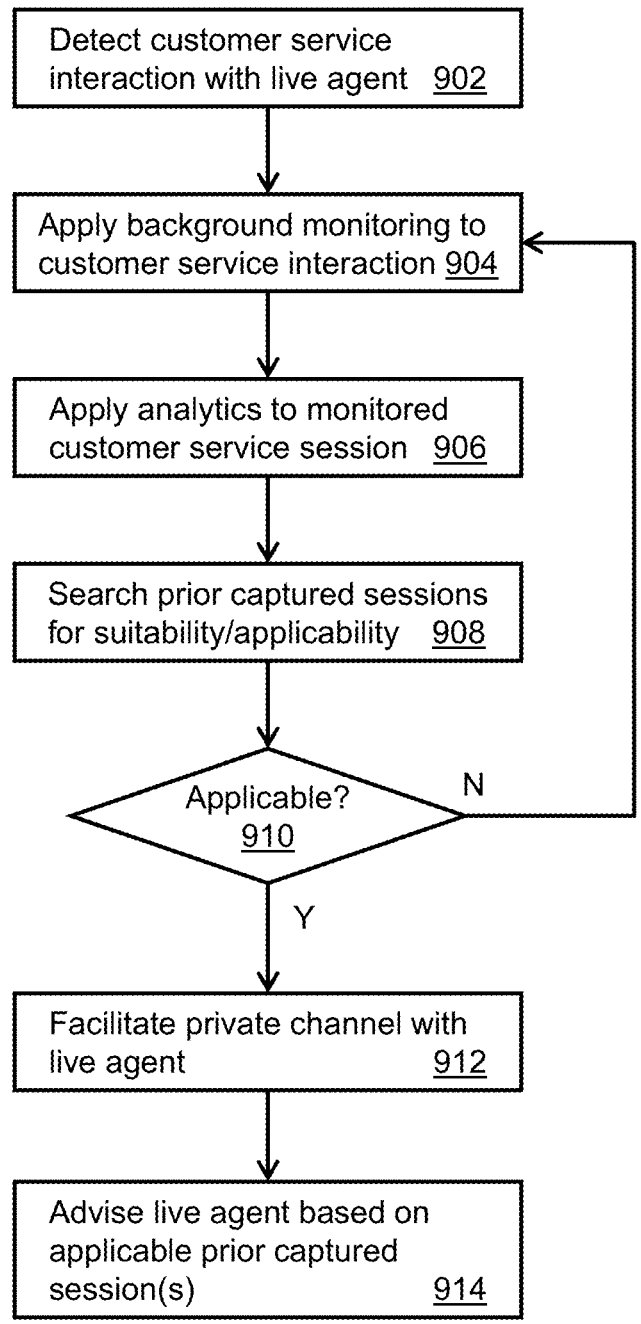
FIG. 9 depicts an illustrative embodiment of an example process used by the systems of FIGS. 1-4.

FIG. 9 depicts an illustrative embodiment of an example process 900 used by one or more of the systems of FIGS. 1-4. An automated session manager runs in the background and reviews the session based on analytics to also determine if it can assist the live, human agents in providing the best information to the customer. A, so called, "golden database" can be searched based on a match between content of the communication exchange and metadata associated with prior captured sessions.

If the automated session manager determines that a captured session of a particular solution from the "golden database" is applicable to a current session with a live agent, the session manager can provide this to the live agent (like whispering in the agent's ear) to assist the live agent in the resolution. This provides a form of just-in-time training that gives human agents access to the most current solutions to the most difficult problems, without the need for the agent to search for them. Once identified based on an automated review of the database, the session manager proactively pushes these captured sessions to the agents for review and use in giving support in a live session.

The process 900 detects customer service interaction with a live agent at 902. Background monitoring is applied to customer service interaction at 904. Analytics are applied to the monitored customer service session at 906.

Prior captured sessions are searched at 908 for suitability/applicability.

A determination is made at 910 as to whether any prior captured sessions are applicable to the current issue. To the extent that it is determined that no prior captured sessions are applicable, the process 900 can continue to apply the background monitoring of the customer service interaction at 904, and repeating the subsequent steps.

To the extent that it is determined that a prior captured session is applicable, a private channel is facilitated with live agent and to the exclusion of the customer. Namely, communications with the live agent occurring on the private channel are hidden from the customer. The customer can continue to interact with the live agent without any indication that the live agent has established a private channel with another customer service resource.

The process 900 advises live agent at 914, via the private channel and based on applicable prior captured session(s). In a three way communication between the live agent, the customer and the customer service resource, it is as if the live agent has the benefit of an expert system whispering in their ear during the service session with the customer. As a result, an experience level or knowledge base of any live agent can be elevated instantly to an appropriate level responsive to the particular issues being addressed with the customer.

This approach can benefit management and utilization of a live agent pool by allowing the live agents to service a wider range of customer calls with a greater degree of authority and accuracy. Beneficially, such benefits can be achieved without a need for additional live agent training. Indeed, an entire core of live agents can be effectively trained on a new solution by simply incorporating the new solution into a common knowledge base. Rather, the expert system or database is applied judiciously to an existing customer service session, without the customer being aware that a third party, e.g., the additional customer service resource, is participating.

While for purposes of simplicity of explanation, the respective processes are shown and described as a series of blocks in FIGS. 6-9, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 10:
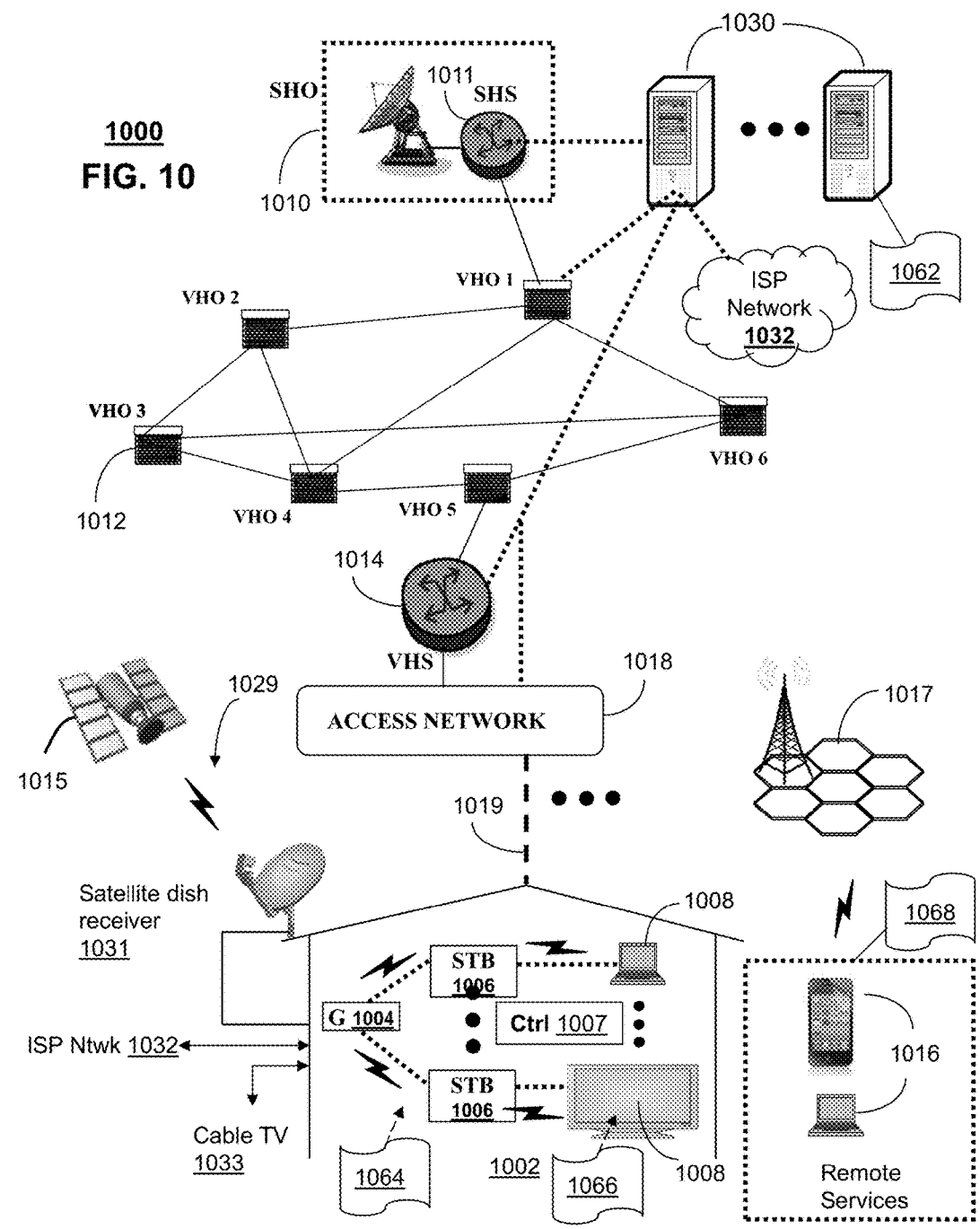
FIGS. 10-11 depict illustrative embodiments of communication systems that provide media services associated with customer care services according to FIGS. 1-9.

FIG. 10 depicts an illustrative embodiment of a first communication system 1000 for delivering media content. The communication system 1000 can represent an Internet Protocol Television (IPTV) media system. Communication system 1000 can be overlaid or operably coupled with the customer care service systems of FIG. 1, FIGS. 4-5, and/or the contact center of FIG. 2, e.g., according to the communication exchanges of FIG. 3, as another representative embodiment of communication system 1000. For instance, one or more devices illustrated in the communication system 1000 of FIG. 10 determine a service request and facilitate a first service session that allows customer equipment to accesses the first service session via a first contact mode, such as voice, chat or video. A first contact resource is associated with the first service session, and participates in a communication exchange with the customer equipment via the first service session according to the first contact mode. A second customer contact resource is associated with the first service session based on an analysis of a customer inquiry. The second contact resource participates in the communication exchange via the first service session and according to a second contact mode that can be the same as or different from the first contact mode.

The IPTV media system can include a super head-end office (SHO) 1010 with at least one super headend office server (SHS) 1011 which receives media content from satellite and/or terrestrial communication systems. In the present context, media content can represent, for example, audio content, moving image content such as 2D or 3D videos, video games, virtual reality content, still image content, and combinations thereof. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller).

The gateway 1004, the media processors 1006, and media devices 1008 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content can be received by a satellite dish receiver 1031 coupled to the building 1002. Modulated signals received by the satellite dish receiver 1031 can be transferred to the media processors 1006 for demodulating, decoding, encoding, and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony, and interactive media services. System 1000 enables various types of interactive television and/or services including IPTV, cable and/or satellite.

The subject disclosure can apply to other present or next generation over-the-air and/or landline media content services system.

Some of the network elements of the Cable TV system 1033 can be coupled to one or more computing devices 1030, a portion of which can operate as a web server for providing web portal services over the ISP network 1032 to wireline media devices 1008 or wireless communication devices 1016.

Communication system 1000 can also provide for all or a portion of the computing devices 1030 to function as a session controller and/or a selective forwarding unit (herein referred to as customer care center server 1030). The customer care center server 1030 can use computing and communication technology to perform function 1062, which can include among other things, one or more of the customer care center service techniques described by processes 600, 700, 800, 900 of FIGS. 6-9. For instance, the function 1062 of the customer care center server 1030 can be similar to one or more of the functions described for the expert system 102 of FIG. 1, the waiting room 204, the service room 210, the bot 212 and/or the queue manager 216 of FIG. 2, the session controller 304 and/or the selective forwarding unit 302 of FIG. 3, the WebRTC platform 408 or other functional elements, e.g., servers, of FIG. 4 in accordance with one or more of the processes 600, 700, 800, 900 of FIGS. 6-9. The media processors 1006, the television 1008, and/or the wireless communication devices 1016 can be provisioned with software functions 1064, 1066 and 1068, respectively, to utilize the services of the customer care center server 1030. For instance, the functions 1062, 1066 and 1068 of the media processors 1006, the television and the wireless communication devices 1016 can be similar to one or more of the functions described for the devices 106, 128 of FIG. 1, the devices 206, 208, 212 of FIG. 2, the devices 302, 304, 308, 314, 320 of FIG. 3, and/or the devices 408 of FIG. 4 in accordance with one or more of the processes 600, 700, 800, 900 of FIGS. 6-9.

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 11:
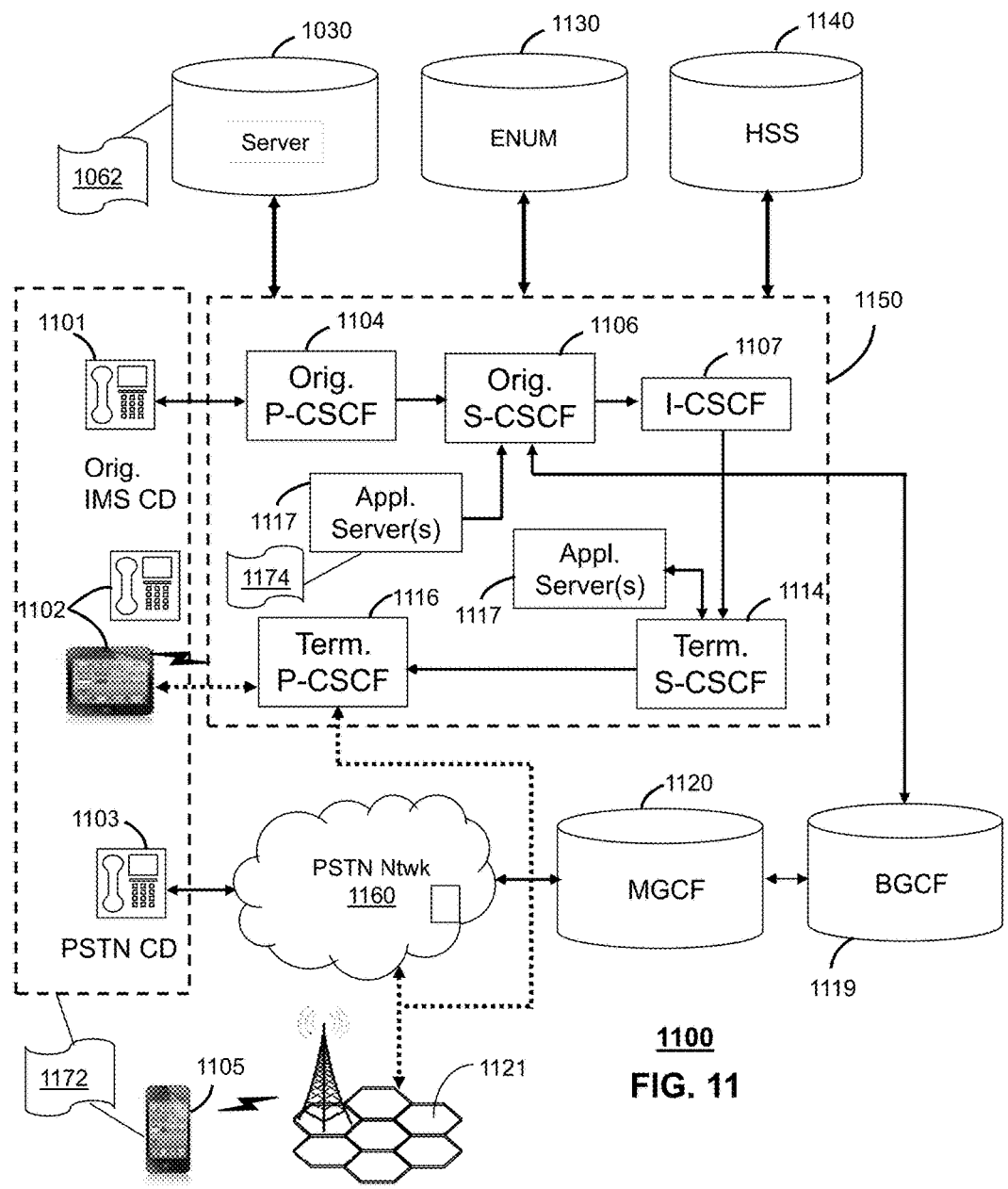

FIG. 11 depicts an illustrative embodiment of a communication system 1100 employing an IP Multimedia Subsystem (IMS) network architecture to facilitate the combined services of circuit-switched and packet-switched systems. Communication system 1100 can be overlaid or operably coupled with the customer care service systems of FIGS. 1 and 4-5, and/or the contact center of FIG. 2, e.g., according to the communication exchanges of FIG. 3 and as another representative embodiment of the communication system 1000. For instance, one or more devices illustrated in the communication system 1100 of FIG. 11 determine a service request and facilitate a first service session that allows customer equipment to accesses the first service session via a first contact mode, such as voice, chat or video. A first contact resource is associated with the first service session, and participates in a communication exchange with the customer equipment via the first service session according to the first contact mode. A second customer contact resource is associated with the first service session based on an analysis of a customer inquiry. The second contact resource participates in the communication exchange via the first service session and according to a second contact mode that can be the same as or different from the first contact mode.

The communication system 1100 can include a Home Subscriber Server (HSS) 1140, a tElephone NUmber Mapping (ENUM) server 1130, and other network elements of an IMS network 1150. The IMS network 1150 can establish communications between IMS-compliant communication devices (CDs) 1101, 1102, Public Switched Telephone Network (PSTN) CDs 1103, 1105, and combinations thereof by way of a Media Gateway Control Function (MGCF) 1120 coupled to a PSTN network 1160. The MGCF 1120 need not be used when a communication session involves IMS CD to IMS CD communications. A communication session involving at least one PSTN CD may utilize the MGCF 1120.

IMS CDs 1101, 1102 can register with the IMS network 1150 by contacting a Proxy Call Session Control Function (P-CSCF) which communicates with an interrogating CSCF (I-CSCF), which in turn, communicates with a Serving CSCF (S-CSCF) to register the CDs with the HSS 1140. To initiate a communication session between CDs, an originating IMS CD 1101 can submit a Session Initiation Protocol (SIP INVITE) message to an originating P-CSCF 1104 which communicates with a corresponding originating S-CSCF 1106. The originating S-CSCF 1106 can submit the SIP INVITE message to one or more application servers (ASs) 1117 that can provide a variety of services to IMS subscribers.

For example, the application servers 1117 can be used to perform originating call feature treatment functions on the calling party number received by the originating S-CSCF 1106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1106 can submit queries to the ENUM system 1130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1107 to submit a query to the HSS 1140 to identify a terminating S-CSCF 1114 associated with a terminating IMS CD such as reference 1102. Once identified, the I-CSCF 1107 can submit the SIP INVITE message to the terminating S-CSCF 1114. The terminating S-CSCF 1114 can then identify a terminating P-CSCF 1116 associated with the terminating CD 1102. The P-CSCF 1116 may then signal the CD 1102 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 11 may be interchangeable. It is further noted that communication system 1100 can be adapted to support video conferencing. In addition, communication system 1100 can be adapted to provide the IMS CDs 1101, 1102 with the multimedia and Internet services of communication system 1100 of FIG. 11.

If the terminating communication device is instead a PSTN CD such as CD 1103 or CD 1105 (in instances where the cellular phone only supports circuit-switched voice communications), the ENUM system 1130 can respond with an unsuccessful address resolution which can cause the originating S-CSCF 1106 to forward the call to the MGCF 1120 via a Breakout Gateway Control Function (BGCF) 1119. The MGCF 1120 can then initiate the call to the terminating PSTN CD over the PSTN network 1160 to enable the calling and called parties to engage in voice and/or data communications.

It is further appreciated that the CDs of FIG. 11 can operate as wireline or wireless devices. For example, the CDs of FIG. 11 can be communicatively coupled to a cellular base station 1121, a femtocell, a WiFi router, a Digital Enhanced Cordless Telecommunications (DECT) base unit, or another suitable wireless access unit to establish communications with the IMS network 1150 of FIG. 11. The cellular access base station 1121 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 11.

Cellular phones supporting LTE can support packet-switched voice and packet-switched data communications and thus may operate as IMS-compliant mobile devices. In this embodiment, the cellular base station 1121 may communicate directly with the IMS network 1150 as shown by the arrow connecting the cellular base station 1121 and the P-CSCF 1116.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The customer care center server 1030 of FIG. 10 can be operably coupled to communication system 1100 for purposes similar to those described above. The customer care center server 1030 can perform function 1062 and thereby provide one or more of the customer care center services to the CDs 1101, 1102, 1103 and 1105 of FIG. 11. These services can be similar to one or more of the functions described for the expert system 106 of FIG. 1, the waiting room 204, the service room 206, the bot 212 and/or the queue manager 216 of FIG. 2, the session controller 304 and/or the selective forwarding unit 302 of FIG. 3, the WebRTC platform 408 or other functional elements, e.g., servers, of FIG. 4 in accordance with one or more of the processes 600, 700, 800, 900 of FIGS. 6-9. The CDs 1101, 1102, 1103 and 1105, which can be adapted with software to perform function 1172 to utilize the services of the customer care center server 1030 similar to one or more of the functions described for the expert system 106 of FIG. 1, the waiting room 204, the service room 206, the bot 212 and/or the queue manager 216 of FIG. 2, the session controller 304 and/or the selective forwarding unit 302 of FIG. 3, the WebRTC platform 408 or other functional elements, e.g., servers, of FIG. 4 in accordance with one or more of the processes 600, 700, 800, 900 of FIGS. 6-9. The customer care center server 1030 can be an integral part of the application server(s) 1117 performing function 1174, which can be substantially similar to function 1162 and adapted to the operations of the IMS network 1150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 12:
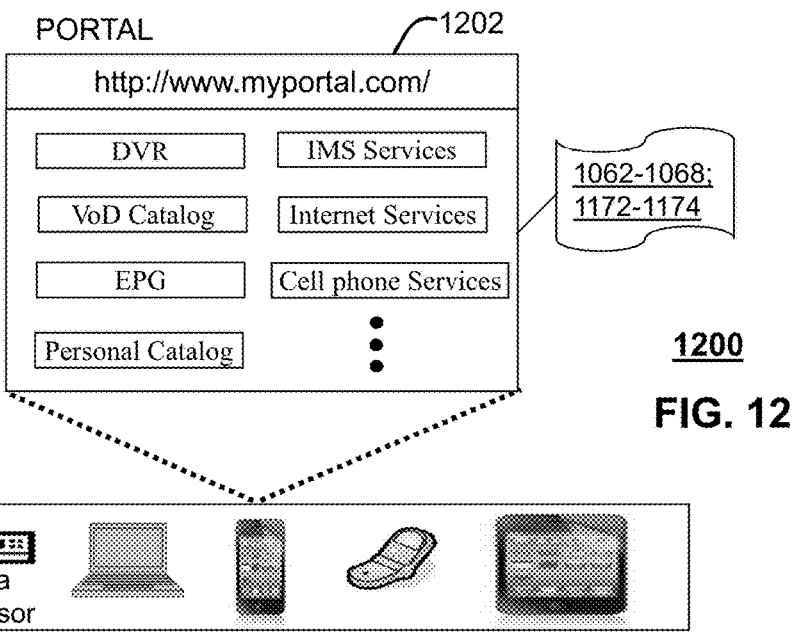
FIG. 12 depicts an illustrative embodiment of a web portal for interacting with one or more of the contact service systems of FIGS. 1-5 and/or the communication systems of FIGS. 10-11.

FIG. 12 depicts an illustrative embodiment of a web portal 1202 of a communication system 1200. Communication system 1200 can be overlaid or operably coupled with the customer care service systems of FIGS. 1 and 4-5, and/or the contact center of FIG. 2, e.g., according to the communication exchanges of FIG. 3, communication system 1000, and/or communication system 1100 as another representative embodiment of the customer care service systems of FIGS. 1 and 4-5, and/or the contact center of FIG. 2, communication system 1000, and/or communication system 1100. The web portal 1202 can be used for managing services of the customer care service systems of FIGS. 1 and 4-5, and/or the contact center of FIG. 2 and communication systems 1000-1100. A web page of the web portal 1202 can be accessed by a Uniform Resource Locator (URL) with an Internet browser using an Internet-capable communication device such as those described in the customer care service systems of FIGS. 1 and 4-5, and/or the contact center of FIG. 2, e.g., according to the communication exchanges of FIG. 3 and the communication systems of FIGS. 10-11. The web portal 1202 can be configured, for example, to access a media processor 1006 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1006. The web portal 1202 can also be used for provisioning IMS services described earlier, provisioning Internet services, provisioning cellular phone services, and so on.

The web portal 1202 can further be utilized to manage and provision software applications 1062-1068, and 1172-1174 to adapt these applications as may be desired by subscribers and/or service providers of the customer care service systems of FIGS. 1 and 4-5, and/or the contact center of FIG. 2, e.g., according to the communication exchanges of FIG. 3, and/or the communication systems 1000-1100. For instance, users of one or more of the services provided by server 106, 302, 304, 408, 502 and/or the customer care center server 1030 can log into their on-line accounts and provision the servers 106, 128, 302, 304, 408, 502 and/or server 1030 with customer information, customer service center information, agent scripts and/or decision trees, equipment and/or service information, revised and/or new solutions, and so on. Service providers can log onto an administrator account to provision, monitor and/or maintain the customer care service systems of FIG. 1, FIGS. 4-5, and/or the contact center of FIG. 2, or the server 1030.

Figure 13:
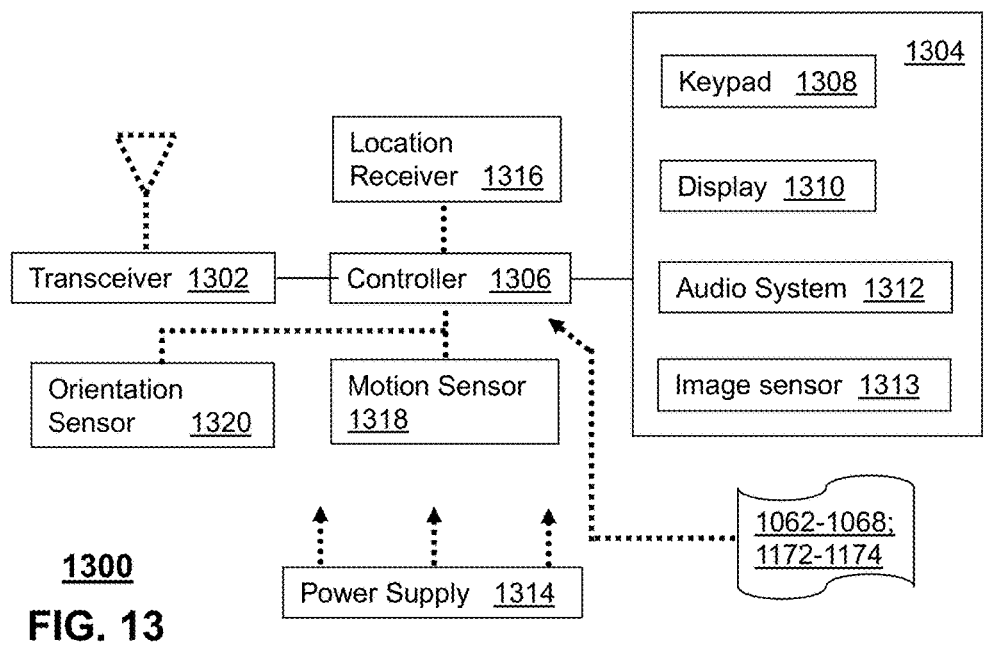
FIG. 13 depicts an illustrative embodiment of a communication device for interacting with one or more of the contact service systems of FIGS. 1-5 and/or the communication systems of FIGS. 10-11.

FIG. 13 depicts an illustrative embodiment of a communication device 1300. Communication device 1300 can serve in whole or in part as an illustrative embodiment of the devices depicted in the systems of FIGS. 1-5, and FIGS. 10-11 and can be configured to perform portions of one or more of the processes 600, 700, 800, 900 of FIGS. 6-9.

The communication device 1300 can comprise a wireline and/or wireless transceiver 1302 (herein transceiver 1302), a user interface (UI) 1304, a power supply 1314, a location receiver 1316, a motion sensor 1318, an orientation sensor 1320, and a controller 1306 for managing operations thereof. The transceiver 1302 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1302 can also be adapted to support circuit-switched wireline access technologies (such as PSTN), packet-switched wireline access technologies (such as TCP/IP, VoIP, etc.), and combinations thereof.

The UI 1304 can include a depressible or touch-sensitive keypad 1308 with a navigation mechanism such as a roller ball, a joystick, a mouse, or a navigation disk for manipulating operations of the communication device 1300. The keypad 1308 can be an integral part of a housing assembly of the communication device 1300 or an independent device operably coupled thereto by a tethered wireline interface (such as a USB cable) or a wireless interface supporting for example Bluetooth®. The keypad 1308 can represent a numeric keypad commonly used by phones, and/or a QWERTY keypad with alphanumeric keys. The UI 1304 can further include a display 1310 such as monochrome or color LCD (Liquid Crystal Display), OLED (Organic Light Emitting Diode) or other suitable display technology for conveying images to an end user of the communication device 1300. In an embodiment where the display 1310 is touch-sensitive, a portion or all of the keypad 1308 can be presented by way of the display 1310 with navigation features.

The display 1310 can use touch screen technology to also serve as a user interface for detecting user input. As a touch screen display, the communication device 1300 can be adapted to present a user interface with graphical user interface (GUI) elements that can be selected by a user with a touch of a finger. The touch screen display 1310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1310 can be an integral part of the housing assembly of the communication device 1300 or an independent device communicatively coupled thereto by a tethered wireline interface (such as a cable) or a wireless interface.

The UI 1304 can also include an audio system 1312 that utilizes audio technology for conveying low volume audio (such as audio heard in proximity of a human ear) and high volume audio (such as speakerphone for hands free operation). The audio system 1312 can further include a microphone for receiving audible signals of an end user. The audio system 1312 can also be used for voice recognition applications. The UI 1304 can further include an image sensor 1313 such as a charged coupled device (CCD) camera for capturing still or moving images.

The power supply 1314 can utilize common power management technologies such as replaceable and rechargeable batteries, supply regulation technologies, and/or charging system technologies for supplying energy to the components of the communication device 1300 to facilitate long-range or short-range portable applications. Alternatively, or in combination, the charging system can utilize external power sources such as DC power supplied over a physical interface such as a USB port or other suitable tethering technologies.

The location receiver 1316 can utilize location technology such as a global positioning system (GPS) receiver capable of assisted GPS for identifying a location of the communication device 1300 based on signals generated by a constellation of GPS satellites, which can be used for facilitating location services such as navigation. The motion sensor 1318 can utilize motion sensing technology such as an accelerometer, a gyroscope, or other suitable motion sensing technology to detect motion of the communication device 1300 in three-dimensional space. The orientation sensor 1320 can utilize orientation sensing technology such as a magnetometer to detect the orientation of the communication device 1300 (north, south, west, and east, as well as combined orientations in degrees, minutes, or other suitable orientation metrics).

The communication device 1300 can use the transceiver 1302 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1300.

Other components not shown in FIG. 13 can be used in one or more embodiments of the subject disclosure. For instance, the communication device 1300 can include a reset button (not shown). The reset button can be used to reset the controller 1306 of the communication device 1300. In yet another embodiment, the communication device 1300 can also include a factory default setting button positioned, for example, below a small hole in a housing assembly of the communication device 1300 to force the communication device 1300 to re-establish factory settings. In this embodiment, a user can use a protruding object such as a pen or paper clip tip to reach into the hole and depress the default setting button. The communication device 1300 can also include a slot for adding or removing an identity module such as a Subscriber Identity Module (SIM) card. SIM cards can be used for identifying subscriber services, executing programs, storing subscriber data, and so forth.

The communication device 1300 as described herein can operate with more or less of the circuit components shown in FIG. 13. These variant embodiments can be used in one or more embodiments of the subject disclosure.

The communication device 1300 can be adapted to perform the functions of one or more of the devices of FIGS. 1-5, the media processor 1006, the media devices 1008, or the portable communication devices 1016 of FIG. 10, as well as the IMS CDs 1101-1102 and PSTN and/or PLMN (public land mobile network) CDs 1103-1105 of FIG. 11. It will be appreciated that the communication device 1300 can also represent other devices that can operate in one or more of the systems of FIGS. 1-5, communication systems 1000-1100 of FIGS. 10-11 such as a gaming console and a media player. In addition, the controller 1306 can be adapted in various embodiments to perform the functions 1062-1066 and 1172-1174, respectively.

Advanced call center capabilities include, without limitation, one or more of the following advantages:

- Global calling, e.g., application of Internet routing to provide seamless over-the-top communications;
- Call queueing that applies logic, e.g., by way of apps and/or expert systems, that can direct which agent receives which call;
- Automation that allows virtually any application in any language to contribute to the response, solution and/or decision process;
- Simple agent desktops that can be introduced, updated or otherwise modified rapidly, without requiring any specialized equipment;
- Automatic call distribution as a service, e.g., providing call distribution "in the cloud";
- Screen sharing to allow an agent to see what a client, customer or user is seeing, and vice versa;
- Co-browsing to allow an agent to assist a user in filling forms, and the like;
- Session recording and/or archiving;
- Identity-based call handling that allows different users to be directed to different agents and/or call centers as seen fit;
- Directed media that provides personalized announcements per caller;
- Messaging that allows agents to chat with users;
- Document sharing that allows agents/users to review documents, photos, videos, etc., while engaged in a session;
- Voice search allowing agent and/or user utterances to be converted to text, e.g., to a web search, while engaged in a session;
- Product recognition from an image, e.g., a photo of a product, a front or back panel, a tag with the product make/model/serial no., a maintenance reference no. and the like;
- Voice/face identification;
- Mood analysis;
- Wireless connection to other devices, systems and/or instruments, e.g., WiFi, personal area networks, Bluetooth and the like;
- Data rendering, e.g., providing real-time graphs and/or readouts related to a service session;
- Directory integration;
- Presence;
- Group calling;
- File transfer; and
- Webcasting.

Upon reviewing the aforementioned embodiments, it would be evident to an artisan with ordinary skill in the art that said embodiments can be modified, reduced, or enhanced without departing from the scope of the claims described below. For example, the customer care center concept can include processing of any collaborative general business activities, such as the processing of insurance claims.

For example, a policy holder opens a claim form via a hyperlink, an HTML form provides step-by-step instructions. Data can be collected at the scene of an accident, e.g., using a mobile phone or tablet camera, voice recorder and to generally document damage and/or surrounding circumstances. With the touch of a button on the mobile device, an insurance agent or specialist is brought online to advise the policy holder on proper procedures. The agent can see the scene and speak with the policy holder, the other driver, witnesses, police, and so on. The agent can add information to the claim form automatically. The agent can bring a claim adjuster online to assess the claim, and the adjuster can direct the policy holder to visualize areas of damage. The adjuster can record screen shots, video and/or audio to a database. Using the policy holder's GPS, a nearest tow operator can be located. In some instances, the tow operator can be associated with or otherwise bridged or joined into the conversation with the agent and the policy holder, allowing the policy holder to talk to the tow operator to receive time estimates, instructions and the like.

More generally, the customer service center techniques disclosed herein can be applied to other situations in which a mobile or remote individual, e.g., a field worker, such as a construction worker or a social worker, encounters an issue that requires application of expertise beyond that currently possessed by the field worker. Other applications can include human services, such as doctor-patient, or more generally, providing immediate and highly relevant medical or clinical information to patients, paramedics, EMTs, police, fire to cope with medical and/or emergency situations. It is envisioned that other equipment, such as medical equipment, scientific instrumentation and the like can be integrated to allow for an immediate and accurate transfer of information in any circumstance.

Still other applications can include providing secure services for emergency communications during disasters, e.g., providing coordination among first responders and government agencies during an emergency. The techniques disclosed herein can apply to virtually any application that would benefit from multi-party, bidirectional, real-time audio, text, video and data streaming, secure or unsecure, with opportunities for recording, data gathering capabilities and analysis capabilities to improve resolution and/or responses to current and future situations. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
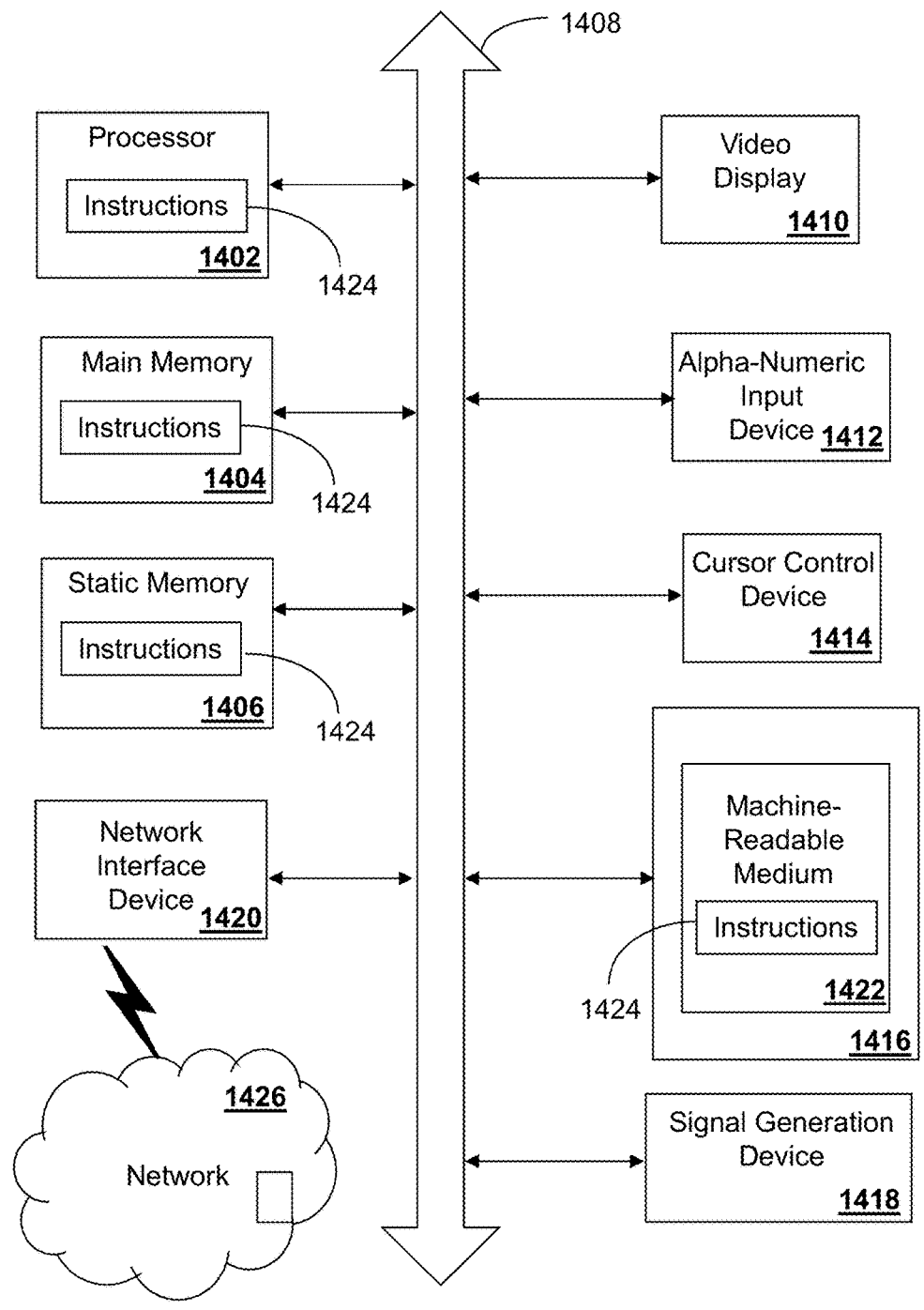
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods described above. One or more instances of the machine can operate, for example, as the customer care center server 1030, the media processor 1006, the expert system 106, the knowledge database 128, customer equipment 124, 308 agent equipment 122, 314, 322 the selective forwarding unit 302, the session controller, 304, the WebRTC platform 408, 502 and/or and other devices of FIGS. 1-5 and 10-13. In some embodiments, the machine may be connected, e.g., using a network 1426, to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions, sequential or otherwise, that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor, or controller, 1402, e.g., a central processing unit (CPU), a graphics processing unit (GPU), or both, a main memory 1404 and a static memory 1406, which communicate with each other via a bus 1408. The computer system 1400 may further include a display unit 1410, e.g., a liquid crystal display (LCD), a flat panel, or a solid state display. The computer system 1400 may include an input device 1412, e.g., a keyboard, a cursor control device 1414, e.g., a mouse, a disk drive unit 1416, a signal generation device 1418, e.g., a speaker or remote control, and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions, e.g., software 1424, embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media, e.g., a centralized or distributed database, and/or associated caches and servers, that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications, e.g., WiMAX, GSM, CDMA, LTE, LTE-A can be used by the computer system 1400. In one or more embodiments, information regarding use of services can be generated including services being accessed, media consumption history, user preferences, and so forth. This information can be obtained by various methods including user input, detecting types of communications, e.g., video content vs. audio content, analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    facilitating, by a processing system including a processor, a customer service session via a communication network, wherein customer equipment participates in a first interactive communication exchange with a first customer service agent via a network connection using a first interaction mode;
    monitoring, by the processing system, the first interactive communication exchange;
    associating, by the processing system based on the monitoring, a second customer service agent with the customer service session, wherein the second customer service agent provides a consultation service to the first customer service agent in a second interactive communication exchange using a second interaction mode different from the first interaction mode, without exposing the consultation service to the customer equipment, wherein the first custom er service agent provides, in accordance with the monitoring, an assessment of a customer mood to the second customer service agent; and
    determining, by the processing system based on the assessment, whether to associate an additional customer service resource with the customer service session.

2. The method of claim 1, wherein the first customer service agent comprises an automated system and the second customer service agent is a live agent.

3. The method of claim 2, further comprising determining, by the processing system, an availability of the live agent.

4. The method of claim 3, further comprising modifying, by the processing system, a queue for assignment of the live agent to the customer service session based on the assessment.

5. The method of claim 1, wherein responsive to an interruption of the network connection, the customer service session is maintained for a predetermined time period.

6. The method of claim 5, wherein the customer is a subscriber to the communication network, and wherein the time period is in accordance with a subscription level of the customer.

7. The method of claim 5, wherein the time period is in accordance with an experience of the customer in a previous customer service session.

8. The method of claim 1, wherein the first interaction mode and the second interaction mode each comprise voice, video, instant messaging, short message service (SMS), multimedia messaging service (MMS), hypertext, file transfer, data exchange or any combination thereof.

9. The method of claim 1, wherein at least one of the first interactive communication exchange and the second interactive communication exchange comprises a peer-to-peer connection.

10. The method of claim 1, further comprising:
determining, by the processing system, a customer inquiry based on the monitoring.

11. A device comprising:
a processing system including a processor; and
a memory that stores executable instructions that, when executed by the processing system, facilitate performance of operations comprising:
facilitating a customer service session via a communication network, wherein customer equipment participates in a first interactive communication exchange with a first customer service agent via a network connection using a first interaction mode;
monitoring the first interactive communication exchange;
determining a customer inquiry based on the monitoring;
associating, based on the monitoring, a second customer service agent with the customer service session, wherein the second customer service agent provides a consultation service to the first customer service agent in a second interactive communication exchange using a second interaction mode without exposing the consultation service to the customer equipment, wherein the first customer service agent provides an assessment of a customer mood to the second customer service agent; and
determining, based on the assessment, whether to associate an additional customer service resource with the customer service session.

12. The device of claim 11, wherein the second interaction mode is different from the first interaction mode.

13. The device of claim 11, wherein the first interaction mode and the second interaction mode each comprise voice, video, instant messaging, short message service (SMS), multimedia messaging service (MMS), hypertext, file transfer, data exchange or any combination thereof.

14. The device of claim 11, wherein the first customer service agent comprises an automated system and the second customer service agent is a live agent, and wherein the operations further comprise determining an availability of the live agent.

15. The device of claim 14, wherein the operations further comprise modifying a queue for assignment of the live agent to the customer service session based on the assessment.

16. A non-transitory machine-readable medium comprising executable instructions that, when executed by a processing system including a processor, facilitate performance of operations, comprising:
facilitating a customer service session via a communication network, wherein customer equipment participates in a first interactive communication exchange with a first customer service agent via a network connection using a first interaction mode;
monitoring the first interactive communication exchange;
associating, based on the monitoring, a second customer service agent with the customer service session, wherein the second customer service agent provides a consultation service to the first customer service agent in a second interactive communication exchange using a second interaction mode without exposing the consultation service to the customer equipment, wherein the first customer service agent provides an assessment of a customer mood to the second customer service agent; and
determining, based on the assessment, whether to associate an additional customer service resource with the customer service session.

17. The non-transitory machine-readable medium of claim 16, wherein the second interaction mode is different from the first interaction mode, and wherein the operations further comprise determining a customer inquiry based on the monitoring.

18. The non-transitory machine-readable medium of claim 16, wherein the first interaction mode and the second interaction mode each comprise voice, video, instant messaging, short message service (SMS), multimedia messaging service (MMS), hypertext, file transfer, data exchange or any combination thereof.

19. The non-transitory machine-readable medium of claim 16, wherein the first customer service agent comprises an automated system and the second customer service agent is a live agent.

20. The non-transitory machine-readable medium of claim 19, wherein the operations further comprise modifying a queue for assignment of the live agent to the customer service session based on the assessment.

* * * * *